US010229510B2

(12) United States Patent
Becker et al.

(10) Patent No.: US 10,229,510 B2
(45) Date of Patent: *Mar. 12, 2019

(54) SYSTEMS AND METHODS TO TRACK VEHICLES PROXIMATE PERCEIVED BY AN AUTONOMOUS VEHICLE

(71) Applicant: Uber Technologies, Inc., San Francisco, CA (US)

(72) Inventors: Brian C. Becker, Pittsburgh, PA (US); J. Andrew Bagnell, Pittsburgh, PA (US); Arunprasad Venkatraman, Pittsburgh, PA (US); Karthik Lakshmanan, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/039,864

(22) Filed: Jul. 19, 2018

(65) Prior Publication Data

US 2018/0322650 A1    Nov. 8, 2018

Related U.S. Application Data

(63) Continuation of application No. 15/688,704, filed on Aug. 28, 2017, now Pat. No. 10,037,613.

(Continued)

(51) Int. Cl.
*G06T 7/60* (2017.01)
*G06T 7/246* (2017.01)
(Continued)

(52) U.S. Cl.
CPC .......... *G06T 7/60* (2013.01); *G06K 9/00791* (2013.01); *G06T 7/246* (2017.01); *G08B 13/19608* (2013.01)

(58) Field of Classification Search
CPC ... G06T 7/2013; G06T 7/2033; G06T 7/2046; G06T 7/208; G08B 13/19608; G06K 9/00791; B60R 21/013
See application file for complete search history.

(56) References Cited

U.S. PATENT DOCUMENTS

2012/0257791 A1\* 10/2012 Woo .................. G06T 7/13
382/103
2016/0137206 A1\* 5/2016 Chandraker ............ G06T 17/00
382/104

OTHER PUBLICATIONS

Bagnell et al., "16-899C ACRL: Adaptive Control and Reinforcement Learning: Machine Learning Techniques for Decision Making, Planning, and Control", Class Syllabus, Carnegie Mellon University, Spring 2008, 4 pages.

(Continued)

*Primary Examiner* — Siamak Harandi
(74) *Attorney, Agent, or Firm* — Dority & Manning, P.A.

(57) ABSTRACT

The present disclosure provides systems and methods for tracking vehicles or other objects that are perceived by an autonomous vehicle. A vehicle filter can employ a motion model that models the location of the tracked vehicle using a vehicle bounding shape and an observation model that generates an observation bounding shape from sensor observations. A dominant vertex or side from each respective bounding shape can be identified and used to update or otherwise correct one or more predicted shape locations associated with the vehicle bounding shape based on a shape location associated with the observation bounding shape.

20 Claims, 14 Drawing Sheets

Related U.S. Application Data

(60) Provisional application No. 62/478,663, filed on Mar. 30, 2017.

(51) Int. Cl.
 *G06K 9/00* (2006.01)
 *G08B 13/196* (2006.01)

(56) References Cited

OTHER PUBLICATIONS

Ferguson et al., "Motion Planning in Urban Environments Part I", International Conference on Intelligent Robots and Systems, Sep. 22-26, 2008, Nice, France, 7 pages.

Koller, "Model-Based Object Tracking in Road Traffic Scenes", www.vision.caltech.edu/koller/ModelTracking.html, retrieved on Aug. 26, 2017, 5 pages.

Kuwata et al., "Real-Time Motion Planning with Applications to Autonomous Urban Driving", IEEE Transactions on Control Systems Technology, vol. 17, No. 5, Sep. 2009, pp. 1105-1118.

Li et al., "Vehicle Detection from 3D Lidar Using Fully Convolutional Network", arXiv:1608.07916v1, Aug. 29, 2016, 5 pages.

Miller et al., Efficient Unbiased Tracking of Multiple Dynamic Obstacles Under Large Viewpoint Changes, IEEE Transactions on Robotics, vol. 27, No. 1, Feb. 2011, pp. 29-46.

Paden et al., "A Survey of Motion Planning and Control Techniques for Self-Driving Urban Vehicles", arXiv1604.07446v1, Apr. 25, 2016, 27 pages.

Petrovskaya et al., "Model Based Vehicle Tracking for Autonomous Driving in Urban Environments", Proceedings of Robotics: Science and Systems IV, Jun. 25-28, 2008, Zurich, Switzerland, 8 pages.

Schouwenaars et al., "Safe Receding Horizon Path Planning for Autonomous Vehicles", Proceedings of the Annual Allerton Conference on Communication Control and Computing, vol. 40, No. 1, Oct. 2002, pp. 295-304.

Stachniss, "Robot Mapping: Unscented Kalman Filter", Autonomous Intelligent Systems, 40 pages.

Zelener, "Survey of Object Classification in 3D Range Scans", Technical Report, 2015, 32 pages.

\* cited by examiner

SYSTEMS AND METHODS TO TRACK VEHICLES PROXIMATE PERCEIVED BY AN AUTONOMOUS VEHICLE

PRIORITY CLAIM

The present application is a continuation of U.S. application Ser. No. 15/688,704 having a filing date of Aug. 28, 2017, which claims the benefit of U.S. Provisional Application Ser. No. 62/478,663 filed Mar. 30, 2017. Applicant claims priority to and benefit of all such applications and incorporates all such applications herein by reference.

FIELD

The present disclosure relates generally to tracking vehicles or other objects. More particularly, the present disclosure relates to tracking vehicles that are perceived by an autonomous vehicle by using a vehicle filter that employs prediction and observation bounding shapes.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

Thus, a key objective associated with an autonomous vehicle is the ability to perceive the location of objects (e.g., vehicles) that are perceived by the autonomous vehicle and, further, to track the locations and motions of such objects over time. The ability to accurately and precisely detect and track the locations of vehicles and other objects is fundamental to enabling the autonomous vehicle to generate an appropriate motion plan through its surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for tracking vehicles that are perceived by an autonomous vehicle. The method includes obtaining, by one or more computing devices included in the autonomous vehicle, state data descriptive of a previous state of a tracked vehicle that is perceived by the autonomous vehicle. The previous state of the tracked vehicle includes at least one previous location of the tracked vehicle or a vehicle bounding shape associated with the tracked vehicle. The method includes predicting, by the one or more computing devices, one or more first locations for a first vertex or a first side of the vehicle bounding shape based at least in part on the state data. The method includes obtaining, by the one or more computing devices, observation data descriptive of one or more sensor observations. The method includes determining, by the one or more computing devices, a second location of a second vertex or a second side of an observation bounding shape associated with the tracked vehicle based at least in part on the observation data. The method includes determining, by the one or more computing devices, at least one estimated current location of the first vertex or the first side of the vehicle bounding shape associated with the tracked vehicle based at least in part on a comparison of the one or more first locations for the first vertex or the first side of the vehicle bounding shape to the second location of the second vertex or the second side of the observation bounding shape.

Another example aspect of the present disclosure is directed to a computer system. The computer system includes one or more processors and one or more non-transitory computer-readable media that collectively store instructions that, when executed by the one or more processors, cause the computer system to perform operations. The operations include predicting, by the one or more computing devices, one or more first shape locations for a vehicle bounding shape associated with a tracked vehicle that is perceived by an autonomous vehicle. The operations include identifying, by the one or more computing devices, a first dominant vertex for each of the one or more first shape locations predicted for the vehicle bounding shape. The operations include obtaining, by the one or more computing devices, observation data descriptive of one or more sensor observations. The operations include determining, by the one or more computing devices, a second shape location for an observation bounding shape associated with the tracked vehicle based at least in part on the observation data. The operations include identifying, by the one or more computing devices, a second dominant vertex for the observation bounding shape. The operations include determining, by the one or more computing devices, at least one estimated shape location for the vehicle bounding shape based at least in part on a comparison of a first location of the first dominant vertex for each of the one or more first shape locations to a second location of the second dominant vertex for the observation bounding shape.

Another example aspect of the present disclosure is directed to an autonomous vehicle. The autonomous vehicle includes a tracking system that is operable to track vehicles perceived by the autonomous vehicle. The tracking system includes a motion model operable to predict one or more first shape locations for a vehicle bounding shape associated with a tracked vehicle. The tracking system includes an observation model operable to provide a second shape location of an observation bounding shape associated with the tracked vehicle based at least in part on observation data derived from one or more sensors. The autonomous vehicle includes one or more processors and one or more non-transitory computer-readable media that collectively store instructions that, when executed by the one or more processors, cause the one or more processors to perform operations. The operations include identifying a first dominant vertex or a first dominant side for each of the one or more first shape locations predicted for the vehicle bounding shape. The operations include identifying a second dominant vertex or a second dominant side for the observation bounding shape. The operations include performing, for each of the one or more predicted shape locations, a comparison of the first dominant vertex or the first dominant side to the second dominant vertex or the second dominant side. The operations include determining at least one estimated current location of the first dominant vertex or the first dominant side for the vehicle bounding shape based at least in part on the comparison.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
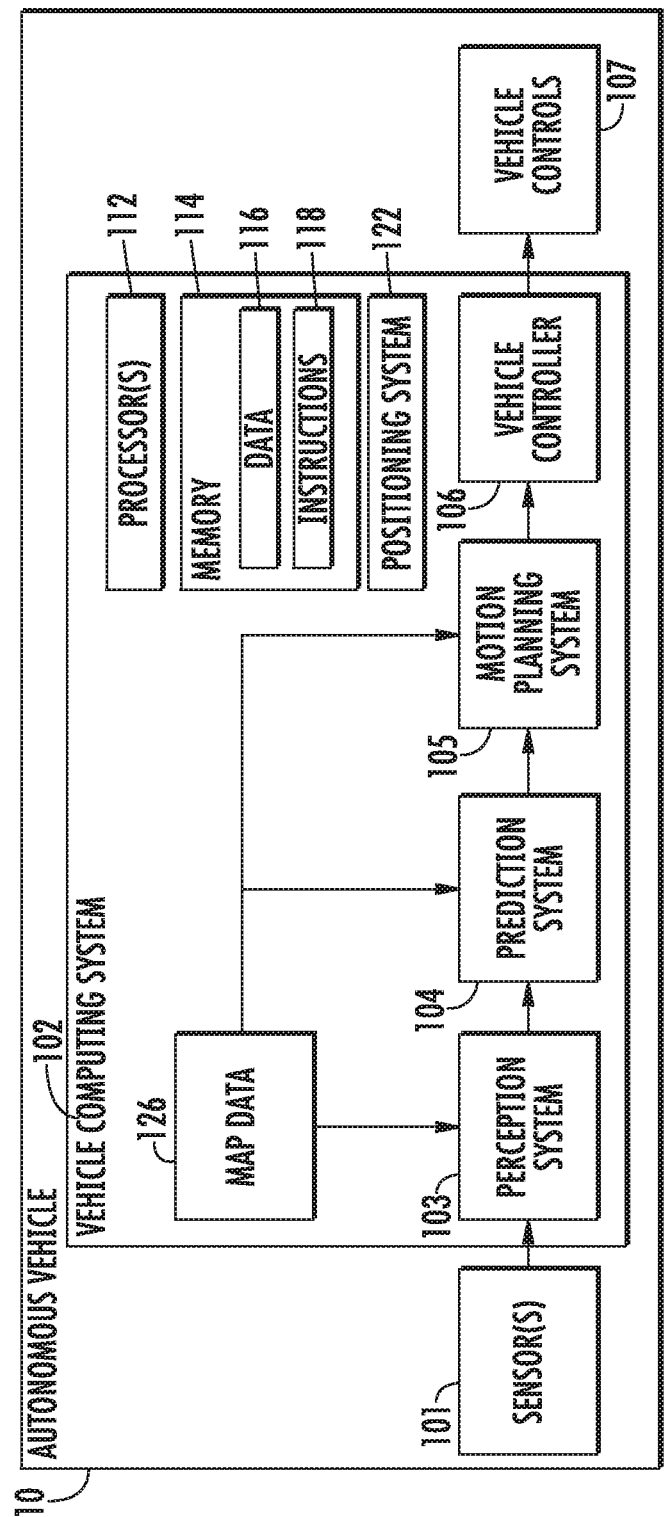
FIG. 1 depicts a block diagram of an example autonomous vehicle according to example embodiments of the present disclosure.

Generally, the present disclosure is directed to systems and methods for tracking vehicles or other objects that are perceived by an autonomous vehicle. In particular, in some implementations of the present disclosure, an autonomous vehicle can include a tracking system that implements a vehicle filter to estimate a current location and/or other parameters of each of one or more tracked vehicles based at least in part on one or more sensor observations that correspond to the tracked vehicles. In some implementations, the vehicle filter can be or include an unscented Kalman filter. According to an aspect of the present disclosure, the vehicle filter can employ a motion model that models the location of the tracked vehicle using a vehicle bounding shape and an observation model that infers the location of an observation bounding shape from sensor observations. Furthermore, according to another aspect of the present disclosure, a dominant vertex or side from each respective bounding shape can be identified and used to update or otherwise correct one or more predicted shape locations associated with the vehicle bounding shape based on a shape location associated with the observation bounding shape. By updating or otherwise correcting the one or more predicted shape locations based on the shape location, the tracking system can more accurately estimate a current location and/or other parameters of each tracked vehicle. In addition, because in many instances the sensor observation and corresponding observation bounding shape correspond to only a portion of the vehicle, use of the dominant vertex and/or side when performing the updating or correction of the one or more predicted shape locations results in more accurate vehicle location estimates relative to other techniques. As a result of such improved vehicle location tracking, the ability to motion plan or otherwise control the autonomous vehicle based on such tracked vehicle locations is enhanced, thereby reducing vehicle collisions and further improving passenger safety and vehicle efficiency.

More particularly, in some implementations, an autonomous vehicle can include a tracking system that tracks the locations of proximate vehicles or other objects based on sensor observations. The autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft).

According to an aspect of the present disclosure, in some implementations, the tracking system includes a vehicle filter that employs a motion model to predict one or more predicted shape locations for a vehicle bounding shape that is representative of a tracked vehicle. For example, the vehicle bounding shape can adhere to an appearance model that models the appearance of the tracked vehicle. As one example, the vehicle bounding shape can be a bounding polygon such as, for example, a bounding rectangle that has a length and width. As another example, the vehicle bounding shape can be a bounding polyhedron such as, for example, a bounding cube.

In some implementations, the motion model can predict the one or more predicted shape locations for the vehicle bounding shape based at least in part on a previous state of the tracked vehicle. As examples, the previous state can include a previous location, size, orientation, velocity, acceleration, yaw rate, and/or other information for the tracked vehicle and/or the vehicle bounding shape that is representative of the tracked vehicle. Thus, the vehicle filter can employ the motion model to iteratively predict one or more predicted shape locations for the vehicle bounding shape that correspond to locations at which the vehicle is expected to be observed at the current iteration. In some implementations, the motion model can simply predict one or more predicted locations for the tracked vehicle and the one or more predicted shape locations for the vehicle bounding shape can be derived (e.g., by the motion model, the observation model, or other tracking system components) from such one or more predicted locations for the tracked vehicle (e.g., through combination with a first size associated with the vehicle bounding shape).

In some implementations, the vehicle filter can also include and/or employ an observation model to determine a shape location for an observation bounding shape based at least in part on observation data descriptive of one or more sensor observations. For example, the observation model can fit the observation bounding shape around a plurality of observed points (e.g., points detected by a Light Detection and Ranging (LIDAR) system), thereby providing a shape location for the observation bounding shape. Similar to the vehicle bounding shape, the observation bounding shape can be a bounding polygon (e.g., rectangle), bounding polyhedron (e.g., cube), or other bounding shapes (e.g., vehicle type-specific shapes). Thus, the vehicle filter can employ the observation model to iteratively determine a shape location for the observation bounding shape that corresponds to a location at which the vehicle was at least partially observed at the current location.

According to another aspect of the present disclosure, the vehicle filter or other component of the tracking system can determine at least one estimated shape location for the vehicle bounding shape based at least in part on a comparison of the one or more predicted shape locations predicted by the motion model for the vehicle bounding shape to the shape location of the observation bounding shape. For example, to determine the at least one estimated shape location, the vehicle filter can update, correct, or otherwise modify the one or more predicted shape locations predicted by the motion model based on the shape location.

As one example, the vehicle filter can assign a weight to each of the one or more predicted shape locations predicted by the motion model, where the weight assigned to each predicted shape location corresponds to an amount of agreement between such predicted shape location and the shape location. In some implementations, a Gaussian representation of the estimated shape location or other estimated state parameters can be computed from the weights.

More particularly, according to an aspect of the present disclosure, a dominant vertex and/or side can be identified for each predicted shape location and, correspondingly, the shape location. For example, the observation model of the vehicle filter can predict the location of the dominant vertex and/or side for each predicted shape location and/or for the shape location.

As examples, the dominant vertex for each predicted shape location can be, in some instances, a nearest unoccluded vertex. The dominant side for each predicted shape location can be, in some instances, a side that includes the dominant vertex and corresponds to a length of the vehicle. In some instances, the dominant vertex for the observation bounding shape can be the vertex that geometrically corresponds to the dominant vertex identified for at least one of the predicted shape locations. In some instances, the dominant side for the observation bounding shape can be the side that includes the dominant vertex and has an orientation that is closest to an expected orientation (e.g., an expected heading of the tracked vehicle).

The locations of such dominant vertices and/or sides can be used to determine the at least one estimated shape location. For example, the locations of the dominant vertex and/or side for each predicted shape location predicted by the motion model can be respectively compared to the locations of the dominant vertex and/or side of the observation bounding shape. The one or more predicted shape locations predicted by the motion model can be updated or otherwise corrected based on such comparison. In such fashion, the predicted locations of the vehicle bounding shape can be updated or otherwise corrected based on the locations of the dominant vertex and/or sides, rather than the footprint or centroid of the observation bounding shape as a whole. This is beneficial because, in many instances, the sensor observations capture or otherwise correspond to only a portion of the tracked vehicle. Therefore, use of the dominant vertex and/or side of the observation bounding shape to update or otherwise correct the vehicle bounding shapes is more appropriate than use of the footprint or centroid of the observation bounding shape.

As an example, in some implementations, the systems and methods of the present disclosure can identify the dominant vertex for each of the one or more predicted shape locations predicted by the motion model by obtaining an occlusion map that describes occluded and unoccluded areas. In one example, the tracking system can generate the occlusion map by ray casting from the autonomous vehicle to observed points. Such ray casting enables the tracking system to determine, for each observed point, areas that are occluded by the object that corresponds to such observed point. Areas that are not occluded by an object can be designated as unoccluded or vacant.

The vehicle filter can use the occlusion map to iteratively analyze, for each of the one or more predicted shape locations, one or more nearest vertices in order of proximity until an unoccluded vertex is identified. In some implementations, when a nearest unoccluded vertex cannot be identified for one of the predicted shape locations, the vehicle filter can select a closest occluded vertex and increase a covariance value associated with the tracked vehicle. The dominant vertex of the observation bounding shape can be identified in the same fashion or can be identified by using geometry to identify the vertex of the observation bounding shape that corresponds to a previously selected dominant vertex of the vehicle bounding shape.

As another example, in some implementations, the systems and methods of the present disclosure can identify the dominant side for each of the one or more predicted shape locations predicted by the motion model by identifying the side that corresponds to a closest unoccluded length of the tracked vehicle. For example, the dominant side can be the side that includes the dominant vertex and corresponds to a length of the vehicle. The dominant side of the observation bounding shape can be the side that includes the dominant vertex and is closest to an expected heading (e.g., a heading of one or more of the predicted shape locations or a previous shape location). As described above, the locations of the dominant vertices and/or sides can be used to determine the at least one estimated shape location (e.g., by correcting the predicted shape location(s)).

In addition, according to another aspect of the present disclosure, the vehicle bounding shape can have a size that is maintained iteration over iteration and updated intermittently based on the size of the observation bounding shape. In particular, in some implementations, the vehicle bounding shape can have a first size defined by one or more first values respectively for one or more size parameters while the observation bounding shape has a second size defined by one or more second values respectively for the one or more size parameters. The second size of the observation bounding shape can be adjusted dynamically (e.g., iteration over iteration based on each new observation). In one particular example, the vehicle bounding shape can be a vehicle bounding rectangle, the observation bounding shape can be an observation bounding rectangle, and the one or more size parameters can include a width and a length. In another example, the bounding shapes can be bounding boxes in three dimensions.

According to an aspect of the present disclosure, at a first instance in which a proximate vehicle is observed, the vehicle bounding shape can be initialized to have minimum values for the one or more size parameters. Thereafter, the largest values for a given size parameter than have been observed can be used for the vehicle bounding shape moving forward. Thus, the size of the vehicle bounding shape can grow based on sensor observations, but typically will not shrink. In such fashion, the vehicle bounding shape used to describe the state of the tracked vehicle will avoid underestimating the size of the tracked vehicle, which can be beneficial in instances in which at least a portion of the tracked vehicle is occluded.

As one example technique to implement the above described concept, at each iteration in which an observation bounding shape is identified, the second value of the observation bounding shape for each size parameter can be compared to the first value of the vehicle bounding shape for such size parameter. In instances in which the second value is greater than the corresponding first value, the vehicle bounding shape can be updated to have the second value for such size parameter. Thus, when the observation bounding shape—which typically changes sizes at each iteration to conform to the sensor observation—exceeds the size of the vehicle bounding shape for a given size parameter, the size of the vehicle bounding shape can be increased to match. However, in some implementations, in order to be robust to segmentation failures and spurious observation data, a certain percentage of values (e.g., ten percent) at the extremes for each size parameter can be rejected or other filtering or outlier detection techniques can be performed.

Carrying the size of the vehicle bounding shape forward from iteration to iteration allows the vehicle filter to accurately estimate the size and location of the tracked vehicle even when the corresponding sensor observation for a given iteration does not reflect the true size of the tracked vehicle. As an example, in an example instance in which a tracked vehicle has turned and/or become partially occluded and the corresponding sensor observation now only corresponds to a smaller portion of the vehicle, the systems and methods of the present disclosure can still track the vehicle accurately because the size of the vehicle bounding shape is based on size data captured over a number of previous iterations. Stated differently, even in instances in which the most recent sensor observations capture or otherwise correspond to only a small portion of the tracked vehicle (e.g., the rear of the tracked vehicle), if the location of the dominant vertex and/or dominant side of the observation bounding shape is correctly captured and identified, then such information can be used to update or otherwise correct the predicted shape location of the vehicle bounding shape, which retains the size values from previous iterations. Thus, since the location of the dominant vertex and/or dominant side of the observation bounding shape is used rather than the size, footprint, or centroid of the observation bounding shape, fluctuations in the size of the observation bounding polygon (e.g., as the tracked vehicle turns, is occluded, and/or is otherwise observed in less detail) do not negatively influence the correction of the predicted shape locations of the vehicle bounding shape.

According to another aspect of the present disclosure, at a first instance in which a proximate vehicle is newly observed (e.g., a new sensor observation cannot be associated with an existing tracked vehicle), the systems and methods of the present disclosure can initialize a new vehicle bounding shape for the new vehicle. As one example, initializing the new vehicle bounding shape can include assigning respective minimum values to the vehicle bounding shape for each of one or more size parameters (e.g., width and length). For example, the minimum values can correspond to the size of a small vehicle.

In some implementations, initializing the new vehicle bounding shape for the newly tracked vehicle can also include aligning the new vehicle bounding shape with a dominant vertex of a corresponding new observation bounding shape that has been fitted around the new sensor observation. In addition, initializing the new vehicle bounding shape for the newly tracked vehicle can include determining, based at least in part on an occlusion map, a first amount of unoccluded or vacant area associated with a first possible orientation of the new vehicle bounding shape and a second amount of unoccluded or vacant space associated with a second possible orientation of the new vehicle bounding shape. As it is more likely that the vehicle extends into occluded space rather than vacant or unoccluded space without being observed, the orientation that has the smaller amount of unoccluded or vacant space can be selected as the orientation for the new vehicle bounding shape. In instances in which there is no vacant space around the vehicle (e.g., a significantly occluded vehicle), the orientation can be selected based on the size parameter's minimum value to which the longest observed side is closest (e.g., is the longest observed side closest to a minimum length value or a minimum width value).

According to another aspect of the present disclosure, in some implementations, the tracking system can also detect poor estimates of tracked vehicle state and, in response to detection of such a poor estimate, re-initialize or otherwise reset the vehicle filter for such tracked vehicle. In one example, the tracking system can determine (e.g., using an occlusion map) a current amount of unoccluded or vacant area associated with a current shape location of the vehicle bounding shape. When the current amount of unoccluded or vacant area associated with the current shape location of the vehicle bounding shape exceeds a threshold amount, the tracking system can re-initialize the vehicle bounding shape associated with the tracked vehicle (e.g., by performing the initialization process described above). In another example, the tracking system can determine a current amount of overlap between a current shape location of the vehicle bounding shape and a current shape location. When the current amount of overlap between such predicted and shape locations is less than a threshold amount, the tracking system can re-initialize the vehicle bounding shape associated with the tracked vehicle. In such fashion, drifting of the filter state can be detected and resolved.

Thus, the present disclosure provides systems and methods for tracking vehicles or other objects that are perceived by an autonomous vehicle. The improved ability to estimate the current location of such vehicle can enable improved motion planning or other control of the autonomous vehicle, thereby reducing collisions and further enhancing passenger safety and vehicle efficiency. In addition, although the present disclosure discusses and makes reference to a vehicle filter that assists in tracking proximate vehicles, aspects of the present disclosure can equally be applied to track objects other than vehicles. For example, bounding shapes that have the same or different appearances can be used to predict and correct locations for other objects, in addition or alternatively to vehicles.

As such, one technical effect and benefit of the present disclosure is improved tracking of vehicles or other objects. In particular, the present disclosure provides techniques that enable a computing system to perform vehicle tracking with levels of accuracy and precision that were heretofore unobtainable using existing computers and computing techniques. Thus, the present disclosure improves the operation of an autonomous vehicle computing system and the autonomous vehicle it controls. In addition, the present disclosure provides a particular solution to the problem of vehicle tracking and provides a particular way (e.g., identification of vertices and/or sides in bounding shapes) to achieve the desired outcome. The present disclosure also provides additional technical effects and benefits, including, for example, enhancing passenger safety and improving vehicle efficiency by reducing collisions.

Additional technical effects and benefits provided by aspects of the present disclosure include: better tracking of vehicles in instances where sensor observations do not accurately depict the entirety of the vehicle shape or size; more stable tracking of vehicles; and improved handling of scenarios where portions of the tracked vehicle are occluded.

With reference now to the Figures, example embodiments of the present disclosure will be discussed in further detail.

Example Devices and Systems

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 includes one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

In some implementations, vehicle computing system 102 can further include a positioning system 122. The positioning system 122 can determine a current position of the vehicle 10. The positioning system 122 can be any device or circuitry for analyzing the position of the vehicle 10. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

The perception system 103 can identify one or more objects that are perceived by the autonomous vehicle 10 based on sensor data received from the one or more sensors 101 and/or the map data 126. Thus, in some instances, objects that are perceived by the autonomous vehicle 10 can be objects that are proximate to the autonomous vehicle 10. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are perceived by the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

As one example, in some implementations, the motion planning system 105 can evaluate a cost function for each of one or more candidate motion plans for the autonomous vehicle 10 based at least in part on the current locations and/or predicted future locations of the objects. For example, the cost function can provide a cost (e.g., over time) of adhering to a particular candidate motion plan. For example, the cost provided by a cost function can increase when the autonomous vehicle 10 strikes another object and/or deviates from a preferred pathway (e.g., a preapproved pathway).

Thus, given information about the current locations and/or predicted future locations of objects, the motion planning system 105 can determine a cost of adhering to a particular candidate pathway. The motion planning system 105 can select or determine a motion plan for the autonomous vehicle 10 based at least in part on the cost function(s). For example, the motion plan that minimizes the cost function can be selected or otherwise determined. The motion planning system 105 can provide the selected motion plan to a vehicle controller 106 that controls one or more vehicle controls 107 (e.g., actuators or other devices that control gas flow, steering, braking, etc.) to execute the selected motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
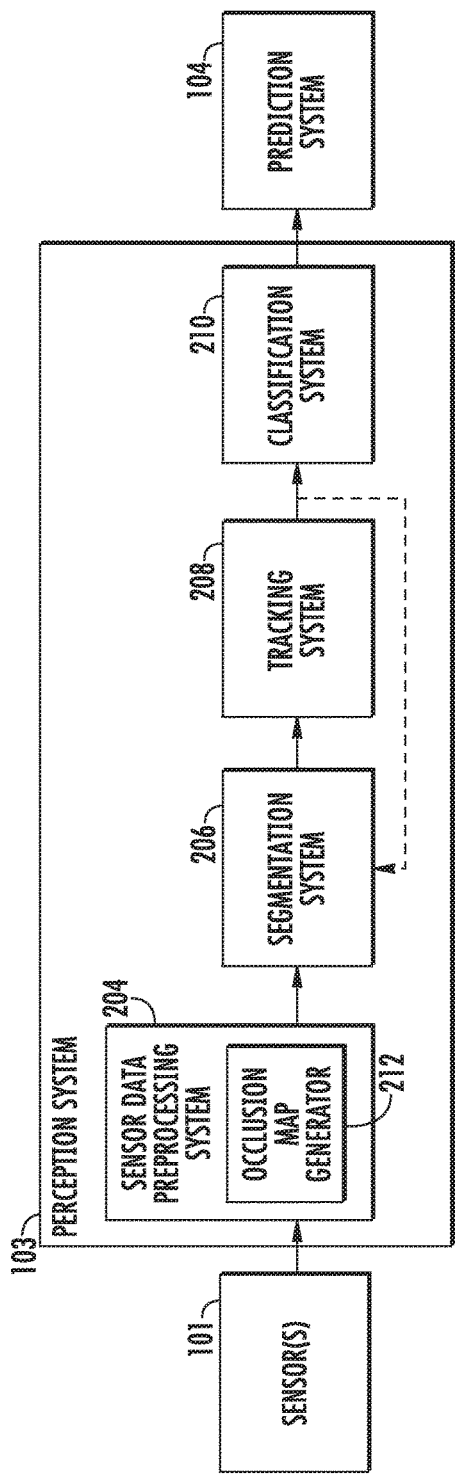
FIG. 2 depicts a block diagram of an example perception system according to example embodiments of the present disclosure.

FIG. 2 depicts a block diagram of an example perception system 103 according to example embodiments of the present disclosure. The example perception system 103 includes a sensor data preprocessing system 204, a segmentation system 206, a tracking system 208, and a classification system 210.

The sensor data preprocessing system 204 can receive sensor data from the one or more sensors 101 and can preprocess such sensor data. As an example, in some implementations, the sensor data preprocessing system 204 can retrieve and/or determine a plurality of locations respectively of a plurality of points observed by a LIDAR system, a RADAR system, one or more cameras, and/or other sensor systems. In some implementations, the sensor data preprocessing system 204 can tag each point or group of points with map information. For example, points or groups of points can be tagged with labels that indicate that the point or groups of points correspond to a sidewalk, a background, a road, a foreground, and/or other tags which can be based on map information. Additional information such as height, distance, and/or region (e.g., road versus reporting zone versus segmentation zone) can be attached to each point.

In some implementations, the sensor data preprocessing system 204 can perform a background subtraction technique to preprocess the sensor data. For example, the sensor data preprocessing system 204 can remove points that are within a certain threshold from a ground level, thereby returning only points that correspond to foreground and background objects. In addition, in some implementations, the sensor data preprocessing system 204 can remove points that correspond to background objects or other permanent obstacles or objects, thereby returning only points that correspond to foreground objects that are proximate to the autonomous vehicle. The points that correspond to foreground objects that are proximate to the autonomous vehicle can be provided to the segmentation system 206. In some implementations, the preprocessing system 204 can further include and implement a spurious point filter that rejects points that do not correspond to true physical objects (e.g., noise).

According to another aspect of the present disclosure, the sensor data preprocessing system 204 (or other system of the vehicle computing system) can include an occlusion map generator 212. The preprocessing system 204 can implement the occlusion map generator 212 to generate an occlusion map that describes occluded and unoccluded areas.

In one example, the sensor data preprocessing system 204 (or other system of the vehicle computing system) can generate the occlusion map by casting rays from the autonomous vehicle to points that were observed by the one or more sensors 101. Such ray casting enables the sensor data preprocessing system 204 to determine, for each observed point, areas that are occluded by the object that corresponds to such observed point. Areas that are not occluded by an object can be designated as unoccluded or vacant.

Figure 13:
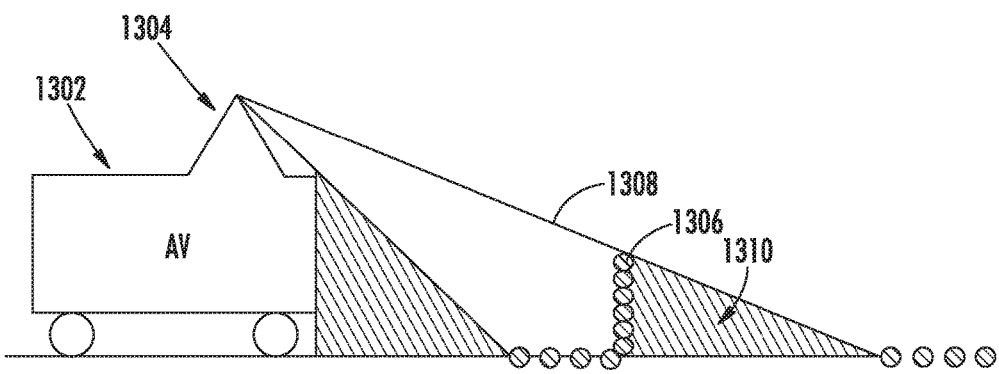
FIG. 13 depicts a graphical diagram of an example technique for generating an occlusion map according to example embodiments of the present disclosure.

To provide an example, FIG. 13 depicts a graphical diagram of an example technique for generating an occlusion map according to example embodiments of the present disclosure. In particular, FIG. 13 depicts an autonomous vehicle 1302 that includes one or more sensor systems, which are depicted at 1304. At least one of the sensor systems 1304 has observed a plurality of points, which are illustrated as circles in FIG. 13. For example, the observed points include an observed point 1306. In addition, although the one or more sensor systems are depicted at 1304 for ease of illustration and explanation, in some implementations, various sensor systems can be located at various different locations other than the roof of the vehicle (e.g., a front bumper, tire well, etc.).

To generate the occlusion map, the sensor data preprocessing system 204 (or other system of the vehicle computing system) can cast a ray from the sensor system 1304 that captured a point to the location of such point. As an example, a ray 1308 can be cast from the sensor system 1304 to the observed point 1306. Locations that are behind a point relative to the sensor system 1304 can be designated as occluded while locations that are in-between a point and the sensor system 1304 can be designated as unoccluded or vacant. By casting rays to each of the observed points, occluded and unoccluded areas can be determined. For example, an occluded area 1310 is shown behind the illustrated observed points (including observed point 1306).

Figure 14:
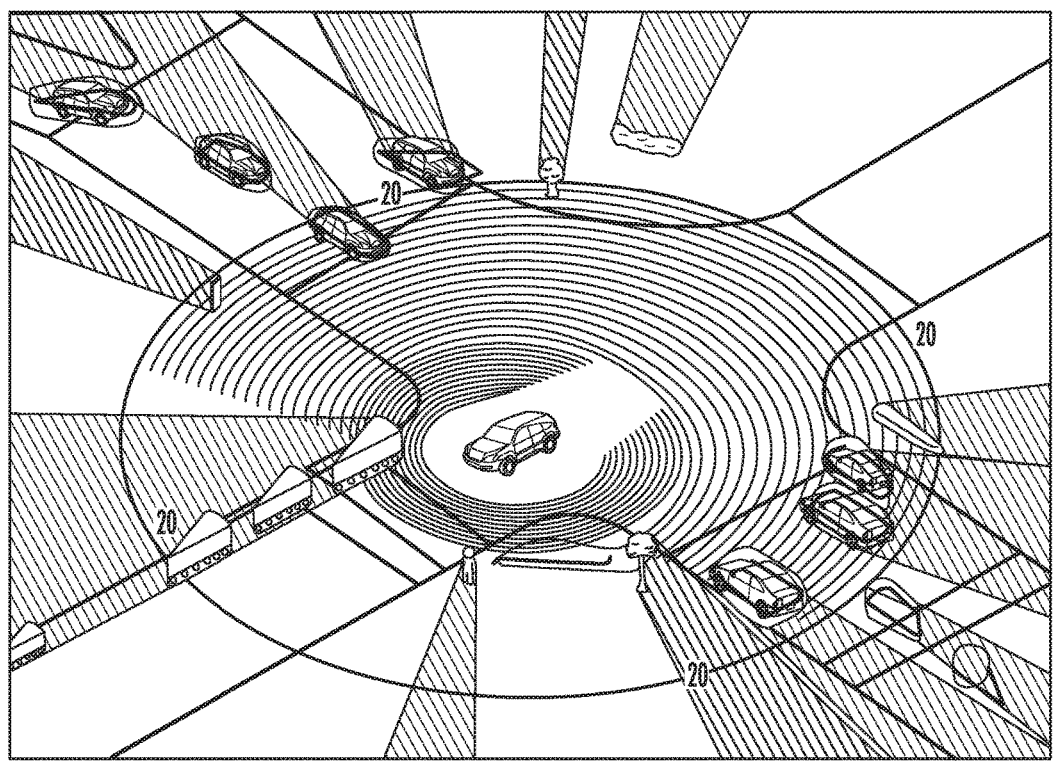
FIG. 14 depicts an example occlusion map according to example embodiments of the present disclosure.

As another example, FIG. 14 depicts an example occlusion map according to example embodiments of the present disclosure. For the example occlusion map depicted in FIG. 14, an intensity of coloration can be indicative of occlusion height.

In some implementations, the occlusion map can be calculated in polar space. In some implementations, the occlusion map can be generated in a background thread as points are received. In some implementations, the occlusion map can be a 2.5 dimensional representation that identifies a lowest and a highest point that is visible in each of a plurality of cells (e.g., 10 cm by 10 cm cells). In some implementations, a ground surface map can be used to calculate the minimum and/or maximum occluded height for each cell.

Referring again to FIG. 2, the segmentation system 206 can receive the preprocessed sensor data and can segment the data into one or more sensor observations that respectively correspond to one or more observed objects. For example, each sensor observation can include one or more points grouped together and can correspond to a single physical object. The segmentation system 206 can provide the sensor observations to the tracking system 208. Thus, the segmentation system 206 can segment the plurality of points observed by the one or more sensors 101 into a number of sensor observations that correspond to one or more observed objects.

The tracking system 208 can tie together sensor observations over time to estimate the state of each observed object. For example, the state of each object can include the object's current location (also referred to as position); current speed (also referred to as velocity); current acceleration; current heading; current orientation; size/footprint (e.g., as represented by a bounding polygon); yaw rate; and/or other state information. In particular, the tracking system 208 can associate sensor observations to estimate the state of each object over time (e.g., as an iterative process that iteratively updates the estimated state of each object based on newly received sensor observations). The tracking system 208 can provide the object state data to the classification system 210. In addition, in some implementations, the tracking system 208 can further provide the object state data back to the segmentation system 206 for use in identifying the sensor observations at a subsequent time period.

The classification system 210 can predict a class for each object. For example, the classification system 210 can predict the class for each object based on the segmentation features of the sensor observations, tracking-based features (e.g., speed), and/or various other features. In some implementations, the classification system 210 can classify each object into one of the four following example classes: vehicle, pedestrian, bicycle, other. In some implementations, the classification system 210 can include a machine-learned classifier. In some implementations, the classification system 210 can average a certain window (e.g., one second) of classifications to perform smoothing of object classification. The classification predicted by the classification system 210 for each object can be added to the existing state data for such object, and some or all of such state data can be provided to the prediction system 104, which was discussed previously with reference to FIG. 1.

Each of the sensor data preprocessing system 204, the occlusion map generator 212, the segmentation system 206, the tracking system 208, and the classification system 210 can include computer logic utilized to provide desired functionality. In some implementations, each of the sensor data preprocessing system 204, the occlusion map generator 212, the segmentation system 206, the tracking system 208, and the classification system 210 can be implemented in hardware, firmware, and/or software controlling a general purpose processor. For example, in some implementations, each of the sensor data preprocessing system 204, the occlusion map generator 212, the segmentation system 206, the tracking system 208, and the classification system 210 includes program files stored on a storage device, loaded into a memory and executed by one or more processors. In other implementations, each of the sensor data preprocessing system 204, the occlusion map generator 212, the segmentation system 206, the tracking system 208, and the classification system 210 includes one or more sets of computer-executable instructions that are stored in a tangible computer-readable storage medium such as RAM hard disk or optical or magnetic media.

Figure 3:
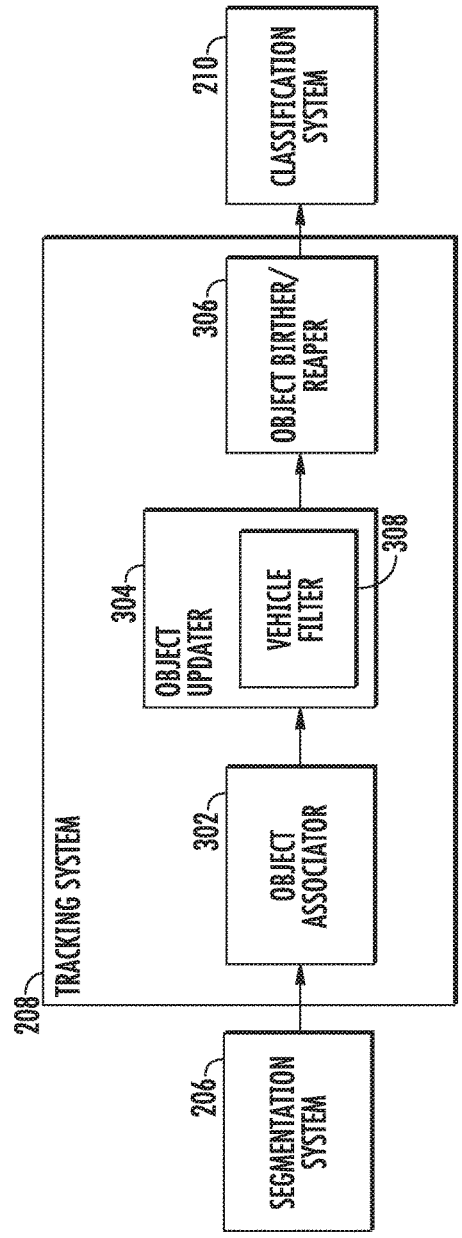
FIG. 3 depicts a block diagram of an example tracking system according to example embodiments of the present disclosure.

FIG. 3 depicts a block diagram of an example tracking system 208 according to example embodiments of the present disclosure. The example tracking system 208 includes an object associator 302, an object updater 304, and an object birther/reaper 306.

The tracking system 208 can implement the object associator 302 to associate new sensor observations to tracked objects. For example, relative distance from a new sensor observation to a tracked object, class of a tracked object versus class of the sensor observation, and/or other various features can be used to determine with which tracked object to associate the new sensor observation.

The tracking system 208 can implement the object updater 304 to update the tracked objects based on the new sensor observations. Thus, as new sensor observations are collected and processed, the current state of a tracked object can be updated based on such observation. Stated differently, as new evidence (e.g., a new sensor observation) of the current state of a tracked object is obtained, the object updater 304 can update the tracking system 208's best estimate of the current state of such tracked object.

In some implementations, the object updater 304 can include a vehicle filter 308. The tracking system 208 can implement the vehicle filter 308 to estimate a current location and/or other related parameters (e.g., size, orientation, etc.) of each of one or more tracked vehicles based at least in part on one or more sensor observations that have been respectively associated with the tracked vehicles. In some implementations, the vehicle filter 308 can be or include an unscented Kalman filter.

The tracking system 208 can implement the object birther/reaper 306 to birth a new tracked object and/or reap previously tracked objects that are no longer present. For example, the object birther/reaper 306 can birth a new tracked object for a new sensor observation that was unable to be associated with a currently tracked object. For example, the object birther/reaper 306 can reap a tracked object that the tracking system 208 expected to observe, but did not observe (e.g., did not observe for a number of consecutive iterations). As another example, the object birther/reaper 306 can reap a tracked object that is estimated to be located in space that is unoccluded or vacant according to the occlusion map.

Each of the object associator 302, the object updater 304, the vehicle filter 308, and the object birther/reaper 306 can include computer logic utilized to provide desired functionality. In some implementations, each of the object associator 302, the object updater 304, the vehicle filter 308, and the object birther/reaper 306 can be implemented in hardware, firmware, and/or software controlling a general purpose processor. For example, in some implementations, each of the object associator 302, the object updater 304, the vehicle filter 308, and the object birther/reaper 306 includes program files stored on a storage device, loaded into a memory and executed by one or more processors. In other implementations, each of the object associator 302, the object updater 304, the vehicle filter 308, and the object birther/reaper 306 includes one or more sets of computer-executable instructions that are stored in a tangible computer-readable storage medium such as RAM hard disk or optical or magnetic media.

Figure 4:
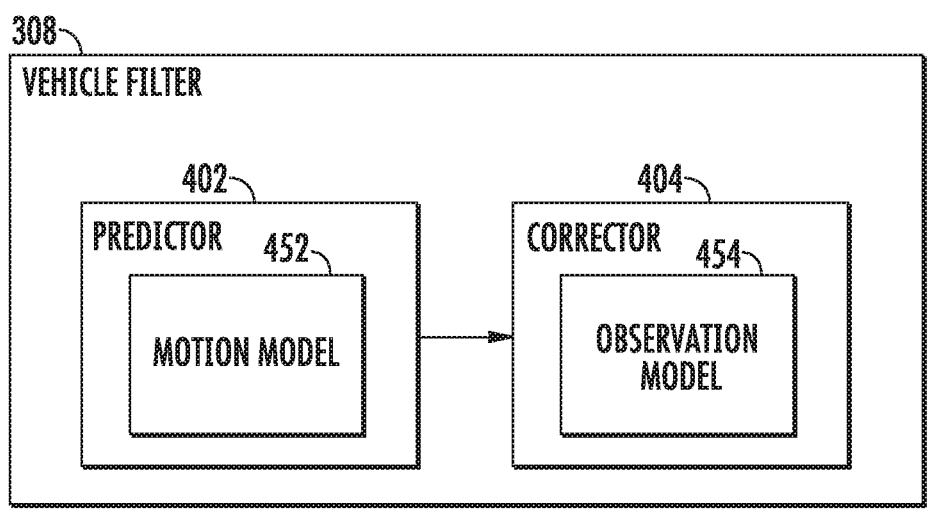
FIG. 4 depicts a block diagram of an example vehicle filter according to example embodiments of the present disclosure.

FIG. 4 depicts a block diagram of an example vehicle filter 308 according to example embodiments of the present disclosure. The example vehicle filter 308 includes a predictor 402 and a corrector 404.

The predictor 402 can be implemented to predict expected locations for a tracked vehicle through use of a motion model 452. More particularly, according to an aspect of the present disclosure, the vehicle filter 308 can employ a motion model 452 to model and predict the location of the tracked vehicle using a vehicle bounding shape. As an example, in some implementations, one or more sigma points can be identified and then used to predict shape locations of the vehicle bounding shape based on a previous state of the tracked vehicle. The sigma points can encode mean and covariance information associated with the previous state of the tracked vehicle. As an example, in some implementations, a canonical set of sigma points can be generated for any number of dimensions n.

In addition, in some implementations, the motion model 452 can be a unicycle model. In particular, the unicycle model can assume fixed curvature turns about the centroid of the vehicle bounding shape. The unicycle model can further assume constant acceleration and yaw rate.

The corrector 404 can be implemented to correct the predicted locations of the tracked vehicle based at least in part on one or more sensor observations associated with such tracked vehicle. In particular, the corrector 404 can employ an observation model 454 to generate an observation bounding shape from sensor observations. In addition, in some implementations, the corrector 404 can compare each of the predicted shape locations from the predictor 402 to a shape location of the observation bounding shape. In some implementations, the corrector 404 can determine and apply a weight to each of the predicted shape locations based on such comparison. For example, the respective weight assigned to each predicted shape location can be indicative of an amount of agreement between such predicted shape location and the shape location.

Furthermore, according to another aspect of the present disclosure, a dominant vertex or side from each respective bounding shape can be identified and used to update or otherwise correct one or more predicted shape locations associated with the vehicle bounding shape based on a shape location associated with the observation bounding shape. By updating or otherwise correcting the one or more predicted shape locations based on the shape location, the vehicle filter 308 can more accurately estimate a current location and/or other state parameters of each tracked vehicle. In particular, because in many instances the sensor observation and corresponding observation bounding shape correspond to only a portion of the tracked vehicle, use of the dominant vertex and/or side by the corrector 404 when updating or correcting the one or more predicted shape locations results in more accurate vehicle location estimates relative to other techniques or shape features (e.g., observation bounding shape centroid).

Each of the predictor 402 and the corrector 404 can include computer logic utilized to provide desired functionality. In some implementations, each of the predictor 402 and the corrector 404 can be implemented in hardware, firmware, and/or software controlling a general purpose processor. For example, in some implementations, each of the predictor 402 and the corrector 404 includes program files stored on a storage device, loaded into a memory and executed by one or more processors. In other implementations, each of the predictor 402 and the corrector 404 includes one or more sets of computer-executable instructions that are stored in a tangible computer-readable storage medium such as RAM hard disk or optical or magnetic media.

In some implementations, the motion model 452 and/or the observation model 454 included in the vehicle filter 308 can be or include machine-learned models. As an example, FIG. 5 depicts a block diagram of an example computing system 100 according to example embodiments of the present disclosure.

Figure 5:
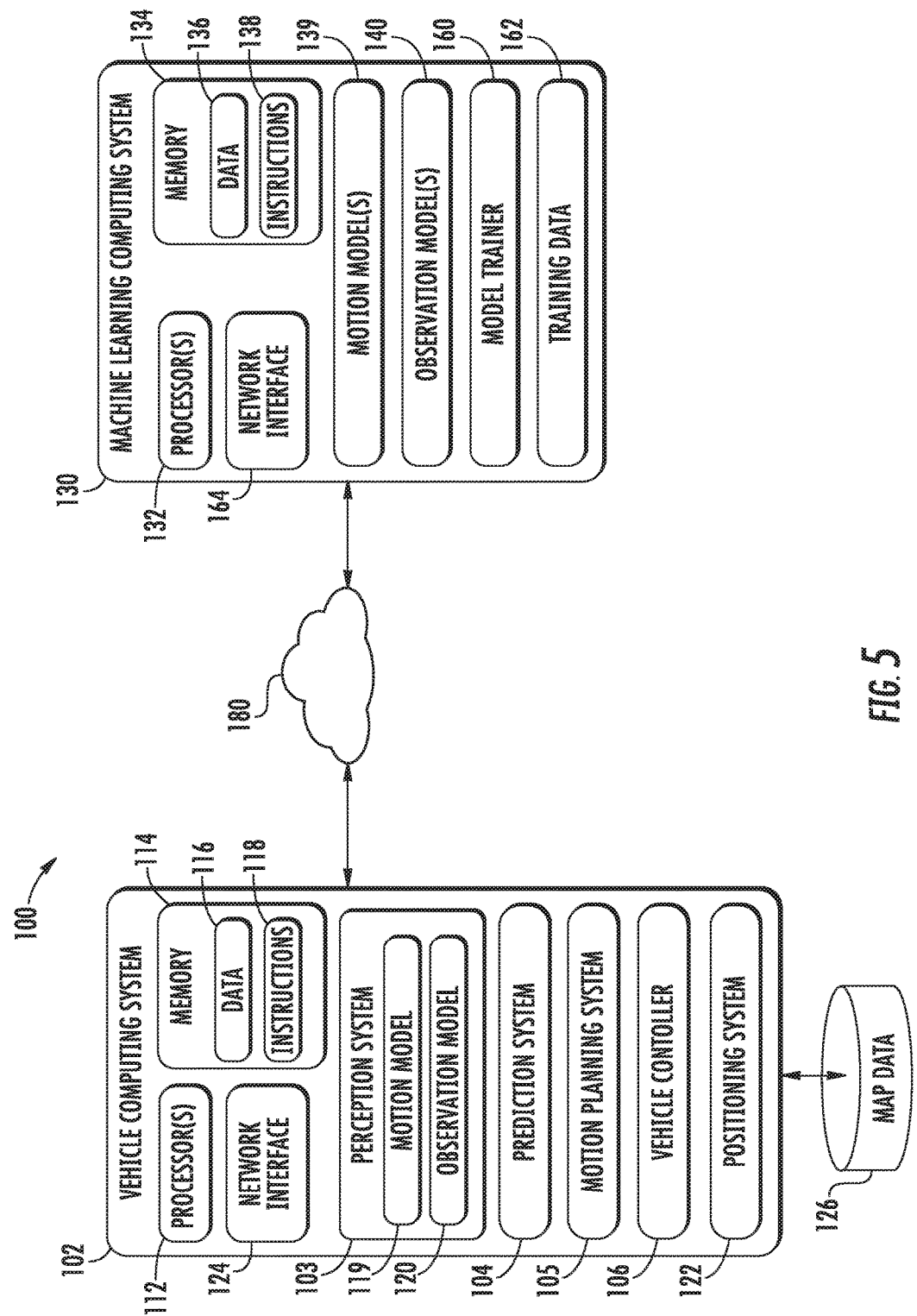
FIG. 5 depicts a block diagram of an example computing system according to example embodiments of the present disclosure.

In particular, FIG. 5 illustrates an example implementation of the present disclosure in which the perception system 103 includes, employs, or otherwise leverages a machine-learned motion model 119 and/or a machine-learned observation model 120. The example system 100 illustrated in FIG. 5 is provided as an example only. The vehicle computing systems of the present disclosure are not required to include or use machine-learned models, but may if desired. Thus, components, systems, connections, and/or other aspects illustrated in FIG. 5 are optional and are provided as examples of what is possible, but not required, to implement the present disclosure.

The example system 100 includes the vehicle computing system 102 and a machine learning computing system 130 that are communicatively coupled over a network 180.

The vehicle computing system 102 can store or include one or more machine-learned models such as a machine-learned motion model 119 and a machine-learned observation model 120. For example, the machine-learned motion model 119 and/or the machine-learned observation model 120 can be or can otherwise include various machine-learned models such as, for example, neural networks (e.g., deep neural networks), or other multi-layer non-linear models. Neural networks can include recurrent neural networks (e.g., long short-term memory recurrent neural networks), feed-forward neural networks, or other forms of neural networks. As another example, the machine-learned motion model 119 and/or the machine-learned observation model 120 can be or can otherwise include one or more decision tree-based models, including, for example, boosted random forest models.

In some implementations, the computing system 102 can receive the machine-learned motion model 119 and/or the machine-learned observation model 120 from the machine learning computing system 130 over network 180 and can store the machine-learned motion model 119 and/or the machine-learned observation model 120 in the memory 114. The computing system 102 can then use or otherwise implement the machine-learned motion model 119 and/or the machine-learned observation model 120 (e.g., by processor(s) 112 to perform parallel object tracking across multiple instances of proximate objects).

Thus, in some implementations, the prediction system 104 can employ the motion model 119 by inputting the previous state of the object into the machine-learned motion model 119 and receiving predicted locations of the tracked object (e.g., predicted bounding shape locations) as an output of the machine-learned motion model 119. Likewise, in some implementations, the prediction system 104 can employ the observation model 120 by inputting the sensor observation into the machine-learned observation model 120 and receiving locations of the tracked object (e.g., a shape location of an observation bounding shape) as an output of the machine-learned observation model 120.

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the machine-learned motion model 119 and/or the machine-learned observation model 120 at the computing system 102, the machine learning computing system 130 can include a machine-learned motion model 139 and/or a machine-learned observation model 140. For example, the models 139/140 can be or can otherwise include various machine-learned models such as neural networks (e.g., deep recurrent neural networks) or other multi-layer non-linear models.

In one example, the machine learning computing system 130 implements the machine-learned motion model 139 and/or the machine-learned observation model 140 for the vehicle computing system 102 according to a client-server relationship. For example, the machine learning computing system 130 can implement the machine-learned motion model 139 and/or the machine-learned observation model 140 can be implemented as a portion of a web service (e.g., an autonomous vehicle motion planning service). Thus, the machine-learned motion model 119 and/or the machine-learned observation model 120 can be stored and implemented at the vehicle computing system 102 and/or the machine-learned motion model 139 and/or the machine-learned observation model 140 can be stored and implemented at the machine learning computing system 130.

In some implementations, the machine learning computing system 130 and/or the computing system 102 can train the machine-learned models 119, 120, 139, and/or 140 through use of a model trainer 160. The model trainer 160 can train the machine-learned models 119, 120, 139, and/or 140 using one or more training or learning algorithms. One example training technique is backwards propagation of errors. In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train one or more of machine-learned models 119, 120, 139, and/or 140 based on a set of training data 162. The training data 162 can include, for example, object state data that is labelled with one or more "correct" predicted locations. As another example, the training data 162 can include sensor observations that are labelled with "correct" locations. In some implementations, the training data 162 is manually labelled. The model trainer 160 can be implemented in hardware, firmware, and/or software controlling one or more processors.

The computing system 102 can also include a network interface 124 used to communicate with one or more systems or devices, including systems or devices that are remotely located from the computing system 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

FIG. 5 illustrates one example computing system 100 that can be used to implement the present disclosure. Other computing systems can be used as well. For example, in some implementations, the computing system 102 can include the model trainer 160 and the training dataset 162. In such implementations, the machine-learned models 110 can be both trained and used locally at the computing system 102. As another example, in some implementations, the computing system 102 is not connected to other computing systems.

In addition, components illustrated and/or discussed as being included in one of the computing systems 102 or 130 can instead be included in another of the computing systems 102 or 130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Example Methods

Figure 6A:
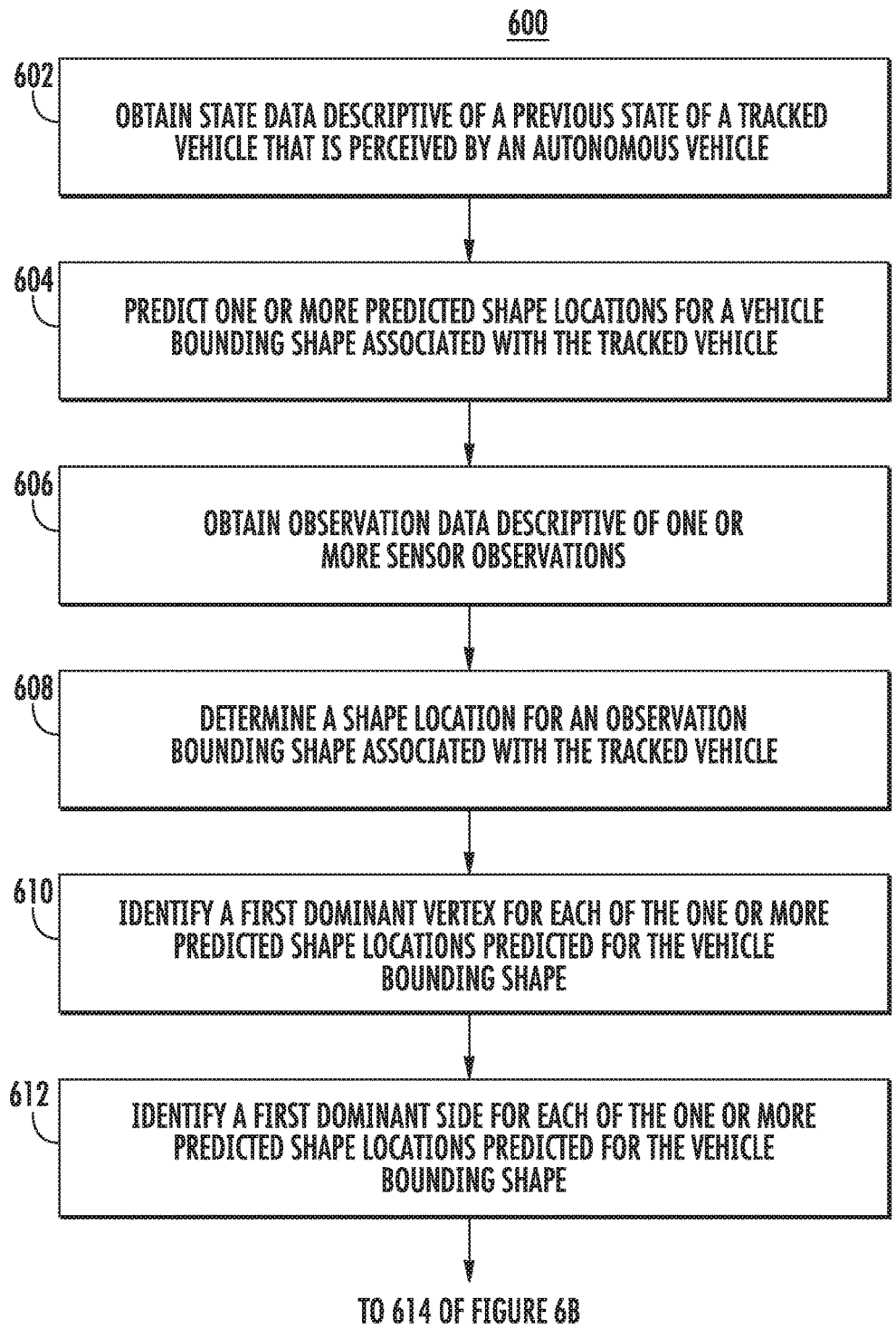
FIGS. 6A and 6B depicts a flow chart diagram of an example method to track vehicles according to example embodiments of the present disclosure.
Figure 6B:
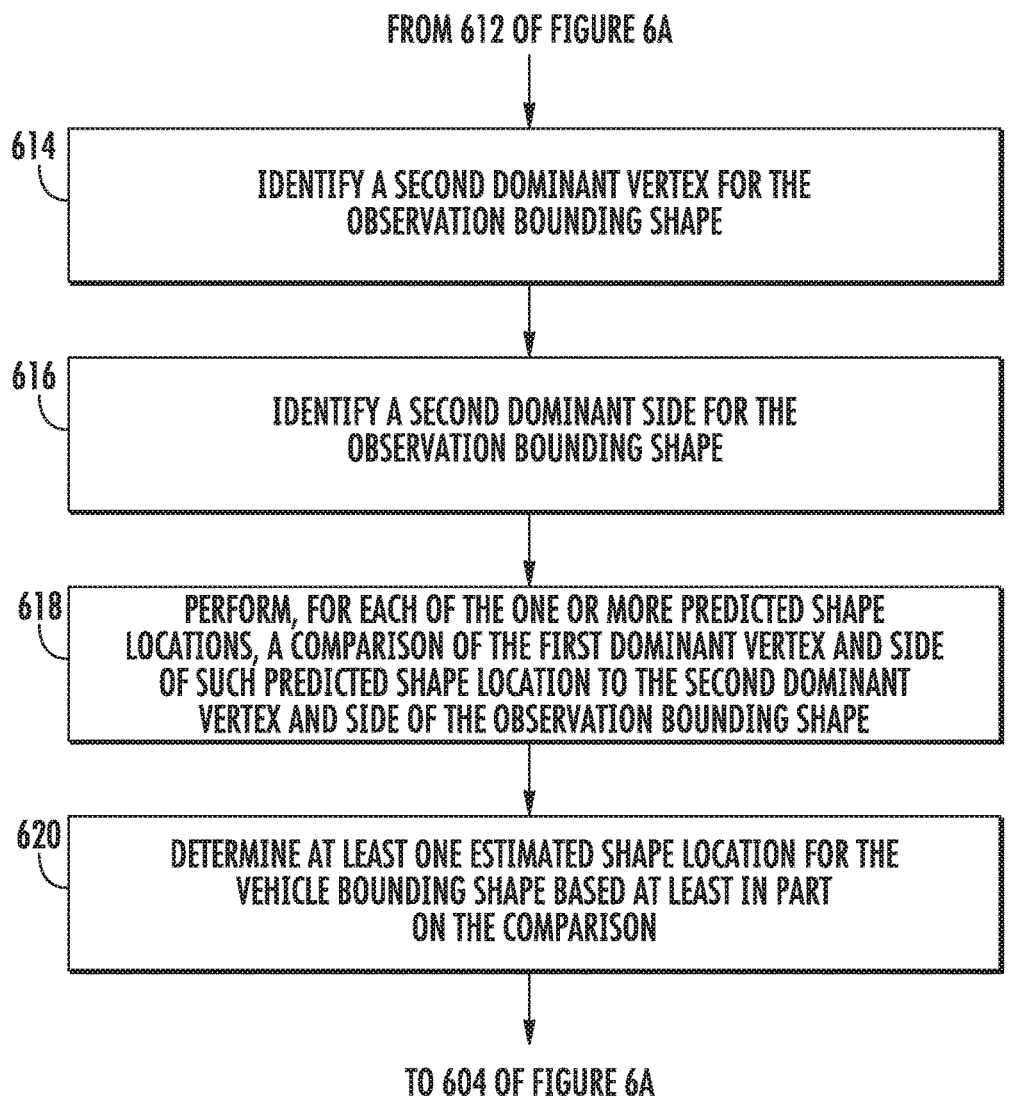

FIGS. 6A and 6B depicts a flow chart diagram of an example method 600 to track vehicles according to example embodiments of the present disclosure.

Referring first to FIG. 6A, at 602, a computing system obtains state data that is descriptive of a previous state of a tracked vehicle that is perceived by an autonomous vehicle. As examples, the previous state can include a previous location, size, orientation, velocity, acceleration, yaw rate, and/or other information for the tracked vehicle and/or a vehicle bounding shape that is representative of the tracked vehicle.

At 604, the computing system predicts one or more predicted shape locations for a vehicle bounding shape associated with the tracked vehicle. In some implementations, the computing system can employ a motion model to predict the one or more predicted shape locations for the vehicle bounding shape based at least in part on the previous state of the tracked vehicle.

As an example, in some implementations, one or more sigma points can be identified and then used to predict shape locations of the vehicle bounding shape based on a previous state of the tracked vehicle. The sigma points can encode mean and covariance information associated with the previous state of the tracked vehicle. As an example, in some implementations, a canonical set of sigma points can be generated in any number of dimensions n.

Figure 7:
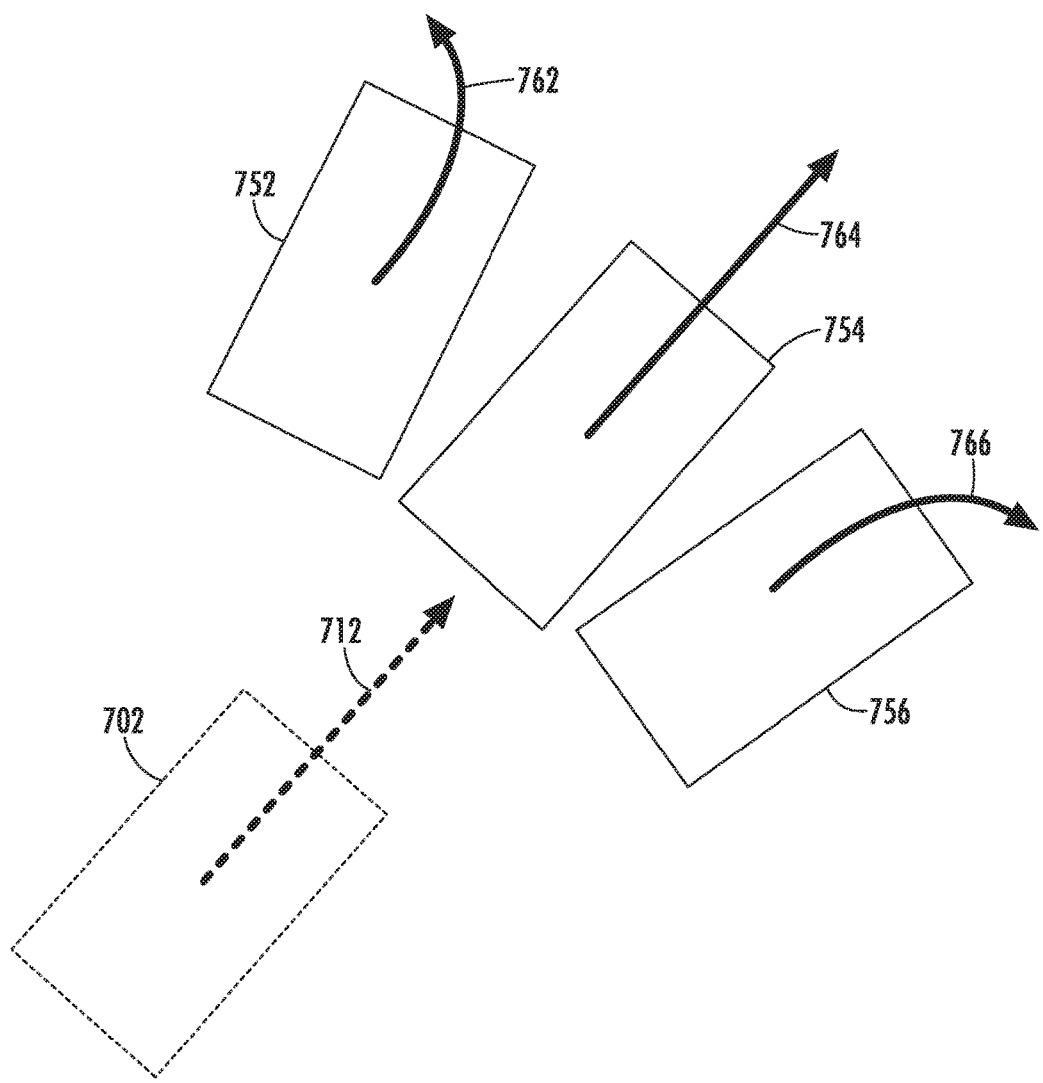
FIG. 7 depicts a graphical diagram of example predicted shape locations according to example embodiments of the present disclosure.

To provide a simplified example illustration, FIG. 7 depicts a graphical diagram of example predicted shape locations according to example embodiments of the present disclosure. In particular, FIG. 7 illustrates a past location 702 of a vehicle bounding shape that is associated with a previous state of the tracked vehicle. Thus, the location 702 of the vehicle bounding shape represents a past estimate of the location of the vehicle. Such previous state can further include information that indicates that the vehicle was traveling according to a heading 712.

FIG. 7 further illustrates predicted shape locations 752, 754, and 756 for the vehicle bounding shape. For example, such predicted shape locations 752, 754, and 756 can have been predicted by a motion model based on the previous state data and three or more sigma points. Each predicted shape location 752, 754, and 756 has a respective heading 762, 764, and 766 associated therewith.

Referring again to FIG. 6A, at 606, the computing system obtains observation data descriptive of one or more sensor observations. More particularly, one or more sensors can be used to collect sensor data that includes information that describes the location (e.g., in three-dimensional space relative to the autonomous vehicle) of points that correspond to objects within the surrounding environment of the autonomous vehicle. The observed points can be segmented into a number of sensor observations. For example, each sensor observation can include one or more observed points grouped together and can correspond to a single physical object.

Figure 8:
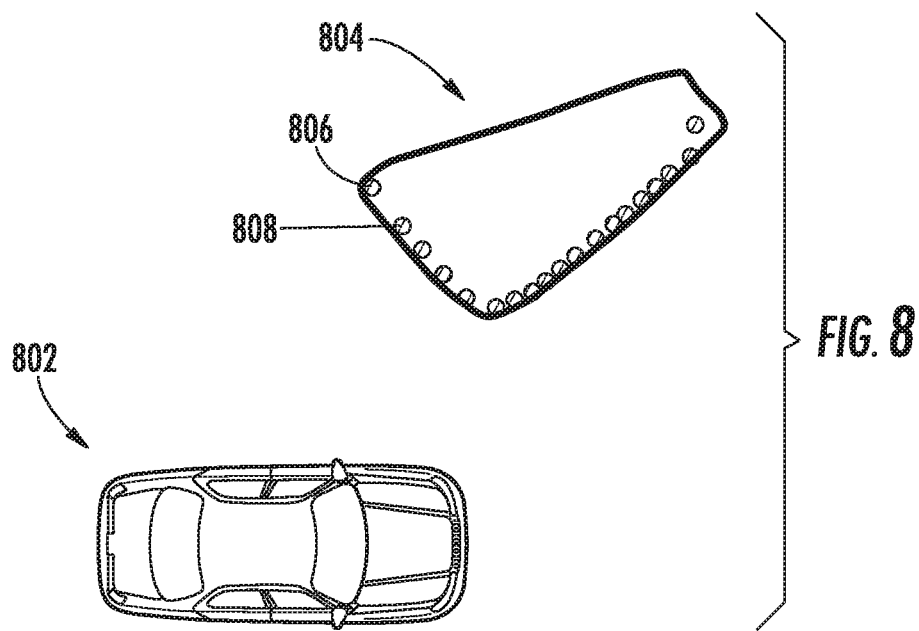
FIG. 8 depicts a graphical diagram of an example sensor observation according to example embodiments of the present disclosure.

To provide a simplified example illustration, FIG. 8 depicts a graphical diagram of an example sensor observation 804 according to example embodiments of the present disclosure. The sensor observation 804 has a known location relative to an autonomous vehicle 802. The sensor observation 804 includes a number of observed points (e.g., points 806 and 808) that have been grouped together. The sensor observation 804 is believed to correspond to a single object (e.g., vehicle) that is proximate to the autonomous vehicle 802.

Referring again to FIG. 6A, at 608, the computing system determines a shape location for an observation bounding shape associated with the tracked vehicle. For example, the computing system can employ an observation model to fit the observation bounding shape around a plurality of observed points included in the sensor observation, thereby providing a shape location for the observation bounding shape.

Figure 9:
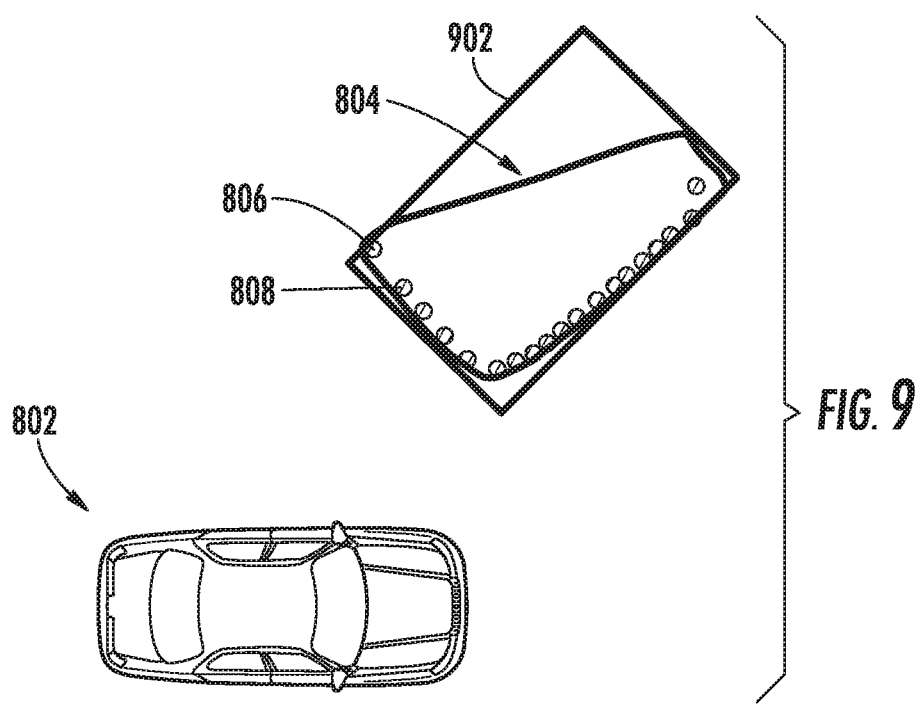
FIG. 9 depicts a graphical diagram of an example observation bounding shape according to example embodiments of the present disclosure.

To provide a simplified example illustration, FIG. 9 depicts a graphical diagram of an example observation bounding shape according to example embodiments of the present disclosure. The observation bounding shape has been fitted around the sensor observation 804 to identify a shape location 902 for the observation bounding shape. In particular, the observation bounding shape has been fitted around the points (e.g., points 806 and 808) included in the sensor observation 804 to identify the shape location 902. As one example, the observation bounding shape can be fitted around the plurality of observed points such that observation shape location 902 includes all of the plurality of observed points and minimizes a collective distance from the plurality of points to respective closest sides of the observation bounding shape.

Referring again to FIG. 6A, at 610, the computing system identifies a first dominant vertex for each of the one or more predicted shape locations predicted for the vehicle bounding shape. As an example, the dominant vertex for each predicted shape location can be a nearest unoccluded vertex.

More particularly, in some implementations, the computing system can identify at 610 the dominant vertex for each of the one or more predicted shape locations predicted by the motion model by obtaining an occlusion map that describes occluded and unoccluded areas. The computing system can use the occlusion map to iteratively analyze, for each of the one or more predicted shape locations, one or more nearest vertices in order of proximity until an unoccluded vertex is identified. In some implementations, when a nearest unoccluded vertex cannot be identified for one of the predicted shape locations, the computing system can select a closest occluded vertex and increase a covariance value associated with the tracked vehicle.

Figure 10:
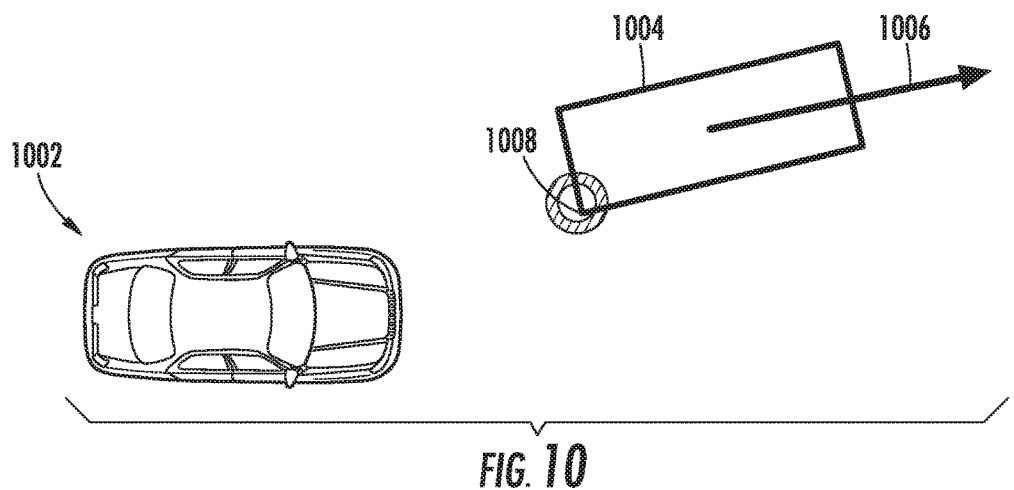
FIG. 10 depicts a graphical diagram of an example technique for identifying a dominant vertex according to example embodiments of the present disclosure.

To provide a simplified example illustration, FIG. 10 depicts a graphical diagram of an example technique for identifying a dominant vertex according to example embodiments of the present disclosure. In particular, FIG. 10 illustrates a predicted shape location 1004 of a vehicle bounding shape relative to an autonomous vehicle 1002. The vehicle bounding shape also has an associated heading 1006.

As illustrated in FIG. 10, a dominant vertex 1008 has been identified for the predicted shape location 1004. In particular, the dominant vertex 1008 corresponds to a nearest unoccluded vertex.

Figure 11:
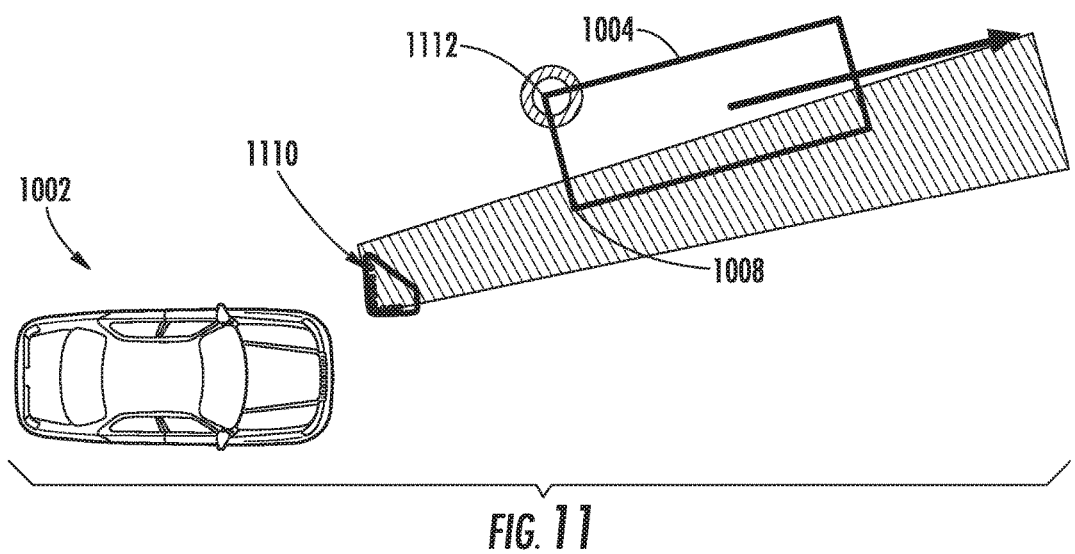
FIG. 11 depicts a graphical diagram of an example technique for identifying a dominant vertex according to example embodiments of the present disclosure.

To provide another simplified example illustration, FIG. 11 depicts a graphical diagram of an example technique for identifying a dominant vertex according to example embodiments of the present disclosure. In particular, FIG. 11 illustrates the predicted shape location 1004 of the vehicle bounding shape relative to the autonomous vehicle 1002.

However, in contrast to FIG. 10, as illustrated in FIG. 11, a sensor observation 1110 indicates that an object is positioned between the autonomous vehicle 1002 and the predicted shape location 1004. In particular, the object represented by sensor observation 1110 occludes the vertex 1008 of the predicted shape location 1004. As such, the vertex 1112 of the predicted shape location 1004 has been identified as the dominant vertex. In particular, the dominant vertex 1112 is the closest unoccluded vertex.

Referring again to FIG. 6A, at 612, the computing system identifies a first dominant side for each of the one or more predicted shape locations predicted for the vehicle bounding shape. As an example, in some implementations, the computing system can identify at 612 the dominant side for each of the one or more predicted shape locations predicted by the motion model by identifying the side that corresponds to a closest unoccluded length of the tracked vehicle. For example, the dominant side can be the side that includes the dominant vertex and corresponds to a length of the vehicle.

Referring now to FIG. 6B, at 614, the computing system identifies a second dominant vertex for the observation bounding shape. As an example, the second dominant vertex for the observation bounding shape can be the vertex that geometrically corresponds to the dominant vertex identified for at least one of the predicted shape locations.

More particularly, in some implementations, the dominant vertex of the observation bounding shape can be identified in the same fashion as described above with respect to 610. In other implementations, the dominant vertex of the observation bounding shape can be identified by using geometry to identify the vertex of the observation bounding shape that corresponds to a previously selected dominant vertex of the vehicle bounding shape.

Figure 12:
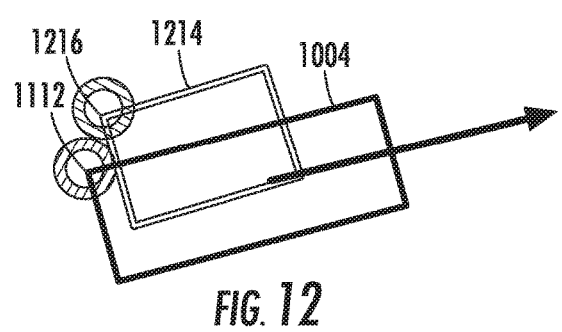
FIG. 12 depicts a graphical diagram of an example technique for identifying a dominant vertex according to example embodiments of the present disclosure.

To provide a simplified example illustration, FIG. 12 depicts a graphical diagram of an example technique for identifying a dominant vertex according to example embodiments of the present disclosure. In particular, FIG. 12 depicts the predicted shape location 1004. A first dominant vertex 1112 has been identified for the predicted shape location 1004.

FIG. 12 further depicts a shape location 1214 of an observation bounding shape. A second dominant vertex 1216 has been identified for the shape location 1214. In particular, the second dominant vertex 1216 geometrically corresponds to the first dominant vertex 1112 identified for the predicted shape location 1004.

Referring again to FIG. 6B, at 616, the computing system identifies a second dominant side for the observation bounding shape. As an example, the dominant side for the observation bounding shape can be the side that includes the dominant vertex and has an orientation that is closest to an expected orientation or heading (e.g., a heading of one or more of the predicted shape locations or a previous shape location).

At 618, the computing system performs, for each of the one or more predicted shape locations, a comparison of the first dominant vertex and side of such predicted shape location to the second dominant vertex and side of the observation bounding shape. For example, a scoring formula can compare the location of the first dominant vertex with the location of the second dominant vertex. For example, a scoring formula can compare the location and/or orientation of the first dominant side with the location and/or orientation of the second dominant side.

Figure 15:
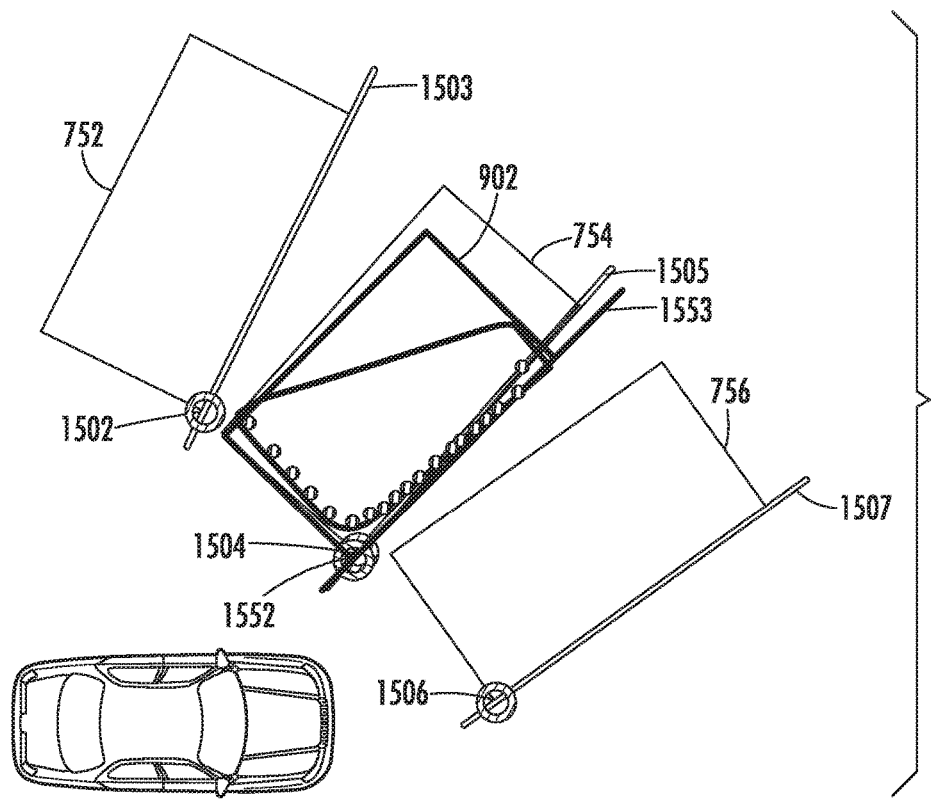
FIG. 15 depicts a graphical diagram of example predicted shape locations and an example shape location according to example embodiments of the present disclosure.

To provide a simplified example illustration, FIG. 15 depicts a graphical diagram of example predicted shape locations and an example shape location according to example embodiments of the present disclosure. In particular, FIG. 15 illustrates the example predicted shape locations 752, 754, and 756 from FIG. 7 and the example shape location 902 from FIG. 9.

A first dominant vertex and side has been identified for each predicted shape location. In particular, a first dominant vertex 1502 and a first dominant side 1503 have been identified for the predicted shape location 752; a first dominant vertex 1504 and a first dominant side 1505 have been identified for the predicted shape location 754; and a first dominant vertex 1506 and a first dominant side 1507 have been identified for the predicted shape location 756. Likewise, a second dominant vertex 1552 and a second dominant side 1553 have been identified for the shape location 902. As described above, the first dominant vertex and/or side for each of the shape locations 752, 754, and 756 can be compared to the second dominant vertex 1552 and the second dominant side 1553 of the shape location 902.

Referring again to FIG. 6B, at 620, the computing system determines at least one estimated shape location for the vehicle bounding shape based at least in part on the comparison performed at 618. For example, to determine the at least one estimated shape location, the computing system can update, correct, or otherwise modify the one or more predicted shape locations based on the comparisons to the shape location.

As one example, the vehicle filter can assign a weight to each of the one or more predicted shape locations predicted by the motion model, where the weight assigned to each predicted shape location corresponds to an amount of agreement between the locations of the first dominant vertex and/or side of such predicted shape location and the locations of the second dominant vertex and/or side of the shape location. In some implementations, a Gaussian representation of the estimated shape location or other estimated state parameters can be computed from the weights.

Referring again to FIG. 15, based on the comparison, a higher weight can be assigned to the predicted shape location 754, while a lower weight can be assigned to the predicted shape locations 752 and 756. Thus, because the first dominant vertex 1504 and the first dominant side 1505 of the predicted shape location 754 have a larger amount of agreement with the second dominant vertex 1552 and the second dominant side 1553 of the shape location 902 than do the vertices 1502 and 1506 and the sides 1503 and 1507, the predicted shape location 754 can receive a higher weight than the predicted shape locations 752 and 756.

In such fashion, the predicted locations of the vehicle bounding shape can be updated or otherwise corrected based on the locations of the dominant vertex and/or sides, rather than the footprint or centroid of the observation bounding shape as a whole. This is beneficial because, in many instances, the sensor observations capture or otherwise correspond to only a portion of the tracked vehicle. Therefore, use of the dominant vertex and/or side of the observation bounding shape to update or otherwise correct the vehicle bounding shapes is more appropriate than use of the footprint or centroid of the observation bounding shape.

Figure 17:
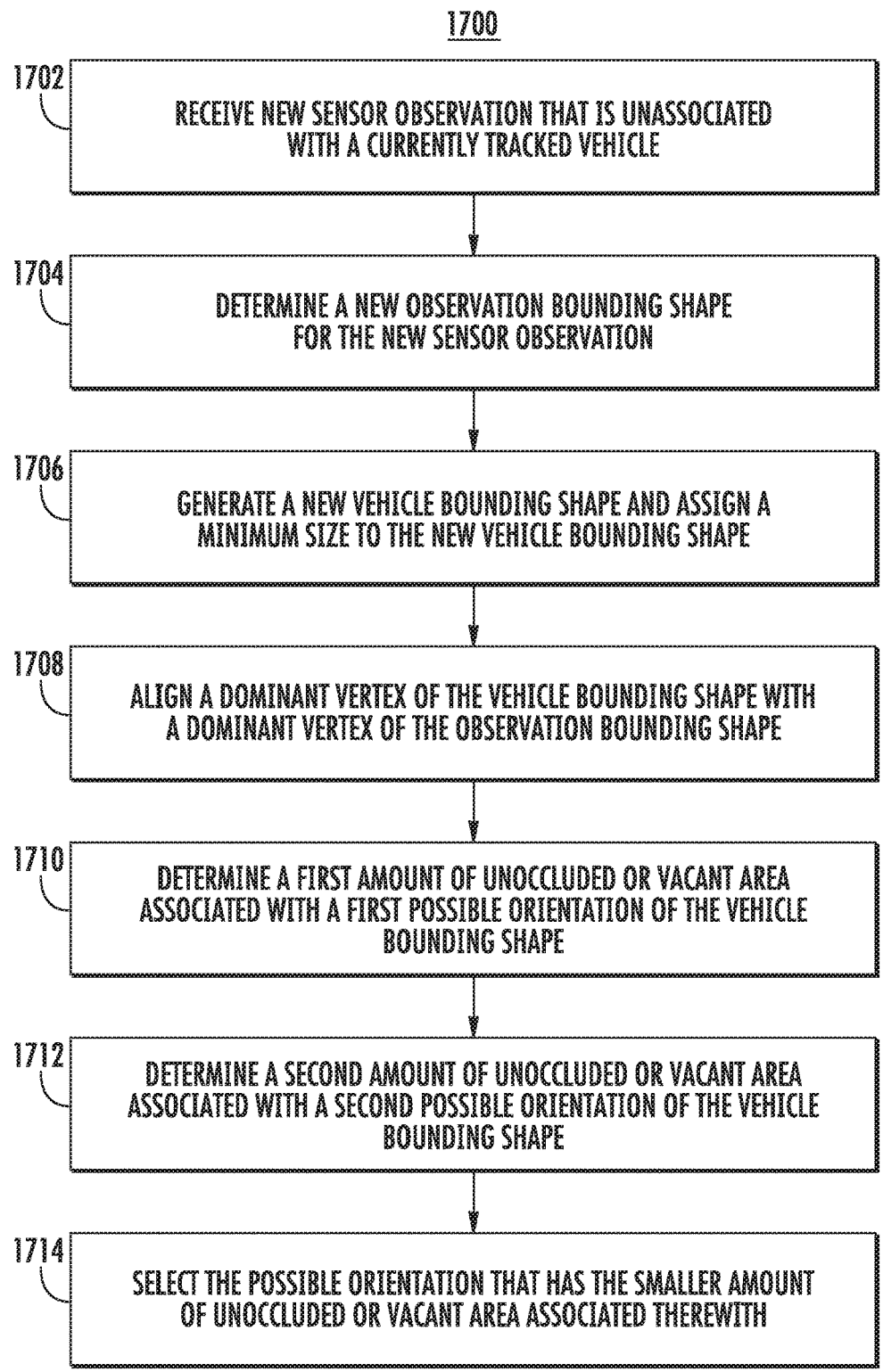
FIG. 17 depicts a flow chart diagram of an example method to initialize a vehicle bounding shape according to example embodiments of the present disclosure.

According to another aspect of the present disclosure, at a first instance in which a proximate vehicle is newly observed (e.g., a new sensor observation cannot be associated with an existing tracked vehicle), the systems and methods of the present disclosure can initialize a new vehicle bounding shape for the new vehicle. As one example, FIG. 17 depicts a flow chart diagram of an example method 1700 to initialize a vehicle bounding shape according to example embodiments of the present disclosure.

At 1702, a computing system receives a new sensor observation that is unassociated with a currently tracked vehicle. At 1704, the computing system determines a new observation bounding shape for the new sensor observation.

At 1706, the computing system generates a new vehicle bounding shape and assigns a minimum size to the new vehicle bounding shape. For example, the minimum size can include one or more minimum values that correspond to the size of a small vehicle.

At 1708, the computing system aligns a dominant vertex of the vehicle bounding shape with a dominant vertex of the observation bounding shape.

At 1710, the computing system determines a first amount of unoccluded or vacant area associated with a first possible orientation of the vehicle bounding shape.

At 1712, the computing system determines a second amount of unoccluded or vacant area associated with a second possible orientation of the vehicle bounding shape.

At 1714, the computing system selects the possible orientation that has the smaller amount of unoccluded or vacant area associated therewith.

Figure 16:
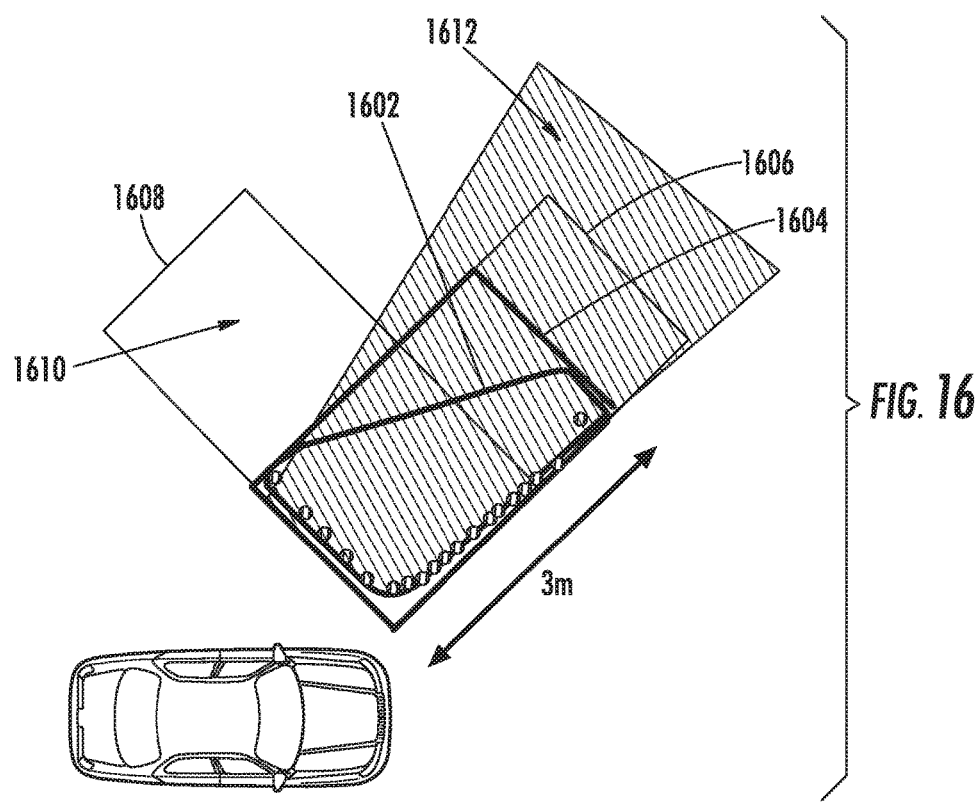
FIG. 16 depicts a graphical diagram of an example technique to initialize a vehicle bounding shape according to example embodiments of the present disclosure.

To provide a simplified example illustration, FIG. 16 depicts a graphical diagram of an example technique to initialize a vehicle bounding shape according to example embodiments of the present disclosure.

In particular, FIG. 16 illustrates a new sensor observation 1602. A new observation bounding shape 1604 has been fitted onto the sensor observation 1602.

A new vehicle bounding shape has been initialized for the new sensor observation 1602 and has been aligned with a dominant vertex of the observation bounding shape 1604.

Two possible orientations exist for the vehicle bounding shape: a first orientation 1606 and a second possible orientation 1608. As described above, an amount of unoccluded or vacant area can be determined for each possible orientation 1606 and 1608.

As illustrated in FIG. 16, a significant portion of the second possible orientation 1608 of the vehicle bounding shape extends into unoccluded area (shown generally at 1610). By contrast, nearly all of the first possible orientation 1608 of the vehicle bounding shape is within an occluded area 1612.

Therefore, the second possible orientation 1608 includes a larger amount of unoccluded or vacant area than the first possible orientation 1606 includes. As such, the first possible orientation 1606 can be selected for the vehicle bounding shape and the vehicle bounding shape can be initialized with the first possible orientation 1606.

Figure 18:
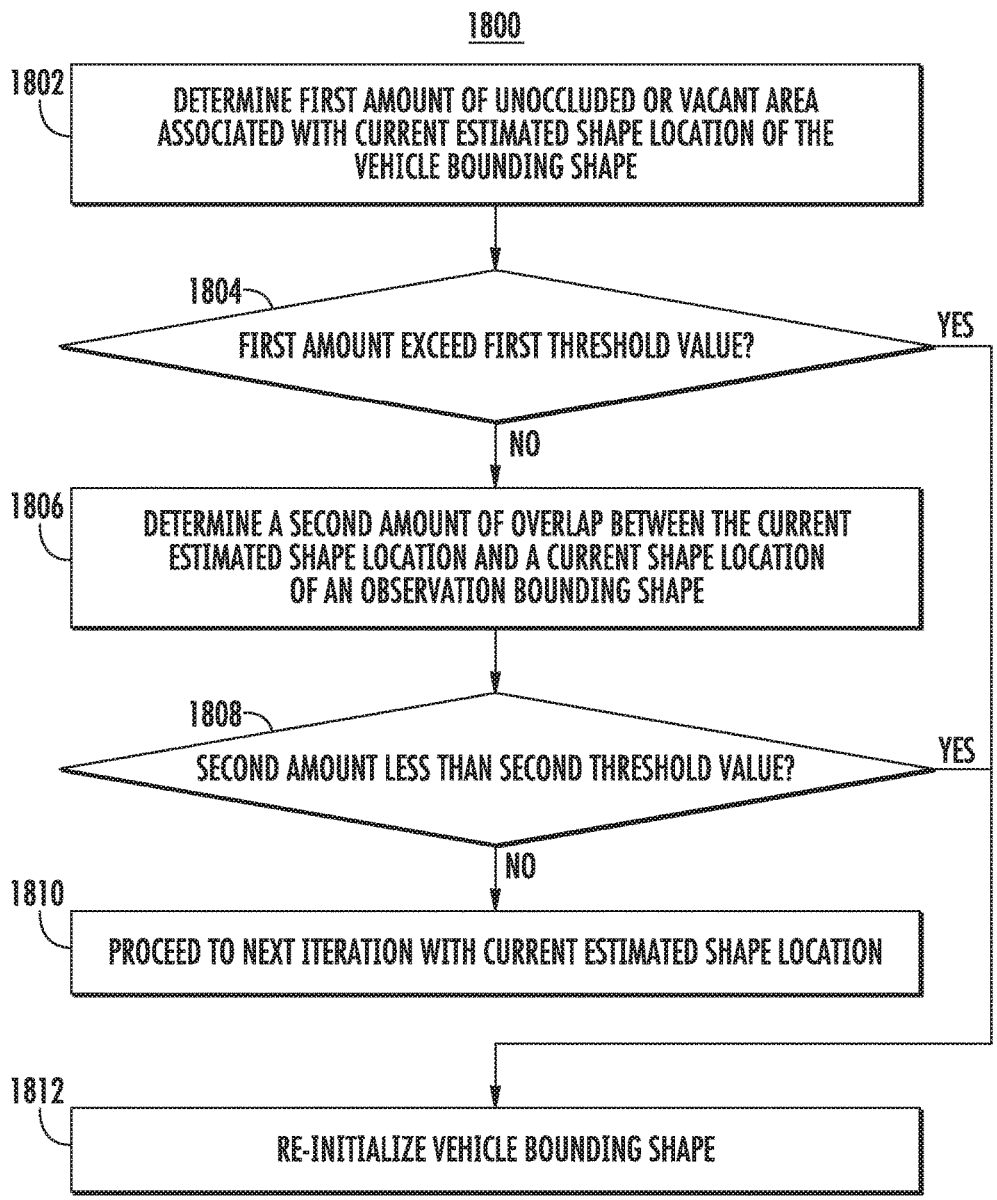
FIG. 18 depicts a flow chart diagram of an example method to detect poor estimates of vehicle location according to example embodiments of the present disclosure.

According to another aspect of the present disclosure, in some implementations, the systems and methods of the present disclosure can also detect poor estimates of tracked vehicle state and, in response to detection of such a poor estimate, re-initialize or otherwise reset the vehicle filter for such tracked vehicle. As one example, FIG. 18 depicts a flow chart diagram of an example method 1800 to detect poor estimates of vehicle location according to example embodiments of the present disclosure.

At 1802, a computing system determines a first amount of unoccluded or vacant area associated with a current estimated shape location of the vehicle bounding shape.

At 1804, the computing system determines whether the first amount exceeds a first threshold value. If it is determined at 1804 that the first amount exceeds the first threshold value, then method 1800 proceeds to 1812 and re-initializes the vehicle bounding shape. However, if it is determined at 1804 that the first amount does not exceed the first threshold value, then method 1800 proceeds to 1806.

Figure 19:
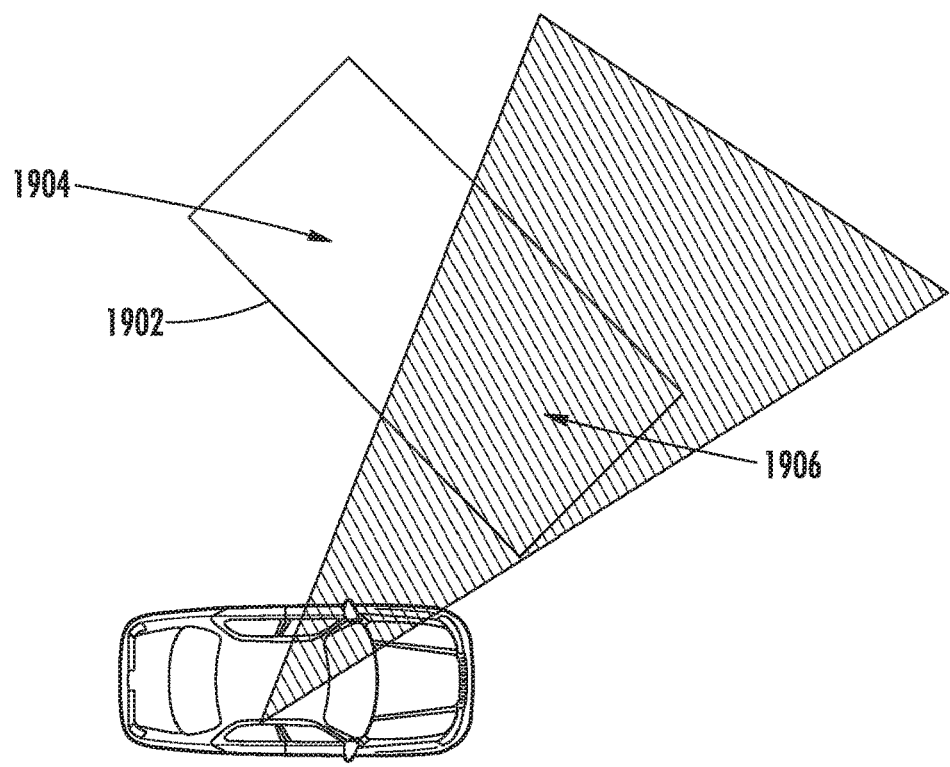
FIG. 19 depicts a graphical diagram of an example technique to detect poor estimates of vehicle location according to example embodiments of the present disclosure.

To provide one simplified example illustration, FIG. 19 depicts a graphical diagram of an example technique to detect poor estimates of vehicle location according to example embodiments of the present disclosure. In particular, FIG. 19 illustrates a current estimated shape location 1902 of a vehicle bounding shape. The current estimated shape location 1902 includes both unoccluded area 1904 and occluded area 1906. If the current estimated shape location 1902 includes too much unoccluded area 1904 (e.g., greater than a first threshold value), then it can be detected as a poor estimate.

Referring again to FIG. 18, at 1806, the computing system determines a second amount of overlap between the current estimated shape location and a current shape location.

At 1808, the computing system determines whether the second amount is less than a second threshold value. If it is determined at 1808 that the second amount is less than the second threshold value, then method 1800 proceeds to 1812. However, if it is determined at 1808 that the second amount is not less than the second threshold value, then method 1800 proceeds to 1810.

Figure 20:
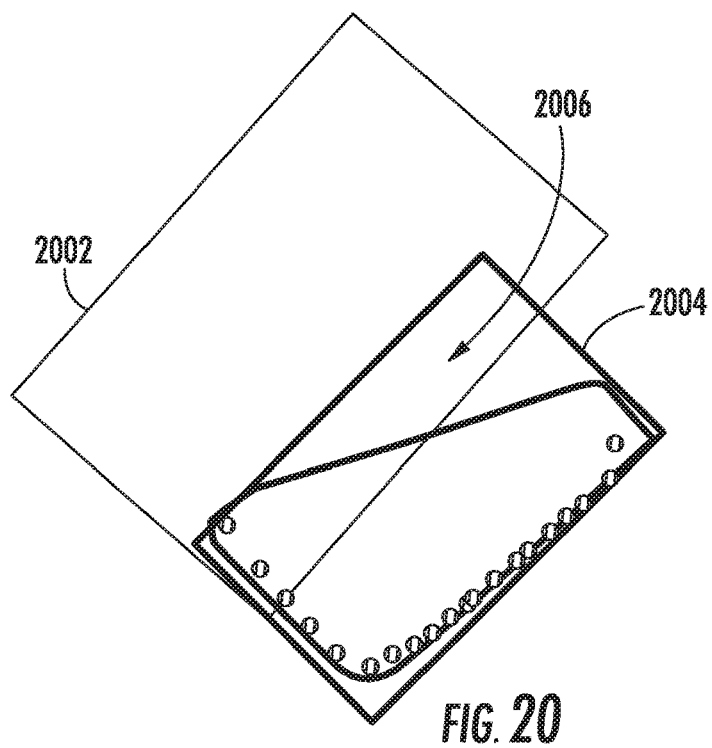
FIG. 20 depicts a graphical diagram of an example technique to detect poor estimates of vehicle location according to example embodiments of the present disclosure.

To provide one simplified example illustration, FIG. 20 depicts a graphical diagram of an example technique to detect poor estimates of vehicle location according to example embodiments of the present disclosure. In particular, FIG. 20 illustrates a current estimated shape location 2002 of a vehicle bounding shape and a location 2004 of an observation bounding shape. The shapes 2002 and 2004 have an overlapping area shown generally at 2006. If the amount of overlapping area 2006 becomes too small (e.g., less than the second threshold value) then the current estimate shape location 2002 can be detected as a poor estimate.

Referring again to FIG. 18, at 1810, the computing system proceeds to the next iteration with the current estimated shape location.

However, at 1812, the computing system re-initializes the vehicle bounding shape. For example, the computing system can perform some or all of method 1700 of FIG. 17 to initialize the vehicle bounding shape.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 6A-B, 17, and 18 respectively depict steps performed in a particular order for purposes of illustration and discussion, the methods of the present disclosure are not limited to the particularly illustrated order or arrangement. The various steps of the methods 600, 1700, and 1800 can be omitted, rearranged, combined, and/or adapted in various ways without deviating from the scope of the present disclosure.

What is claimed is:

1. A computer-implemented method for tracking vehicles that are perceived by an autonomous vehicle, the method comprising:

obtaining, by one or more computing devices included in the autonomous vehicle, state data descriptive of a previous state of a tracked vehicle that is perceived by the autonomous vehicle, wherein the previous state of the tracked vehicle comprises at least one previous location of the tracked vehicle or a vehicle bounding shape associated with the tracked vehicle;

predicting, by the one or more computing devices, one or more first locations for a first portion of the vehicle bounding shape based at least in part on the state data;

obtaining, by the one or more computing devices, observation data descriptive of one or more sensor observations;

determining, by the one or more computing devices, a second location of a second portion of an observation bounding shape associated with the tracked vehicle based at least in part on the observation data; and determining, by the one or more computing devices, at least one estimated current location of the first portion of the vehicle bounding shape associated with the tracked vehicle based at least in part on a comparison of the one or more first locations for the first portion of the vehicle bounding shape to the second location of the second portion of the observation bounding shape.

2. The computer-implemented method of claim 1, wherein determining, by the one or more computing devices, the at least one estimated current location of the first portion of the vehicle bounding shape associated with the tracked vehicle comprises assigning, by the one or more computing devices, a respective weight to each of the one or more first locations based at least in part on the comparison of the one or more first locations for the vehicle bounding shape to the second location of the observation bounding shape, the respective weight assigned to each first location indicative of an amount of agreement between such first location and the second location of the observation bounding shape.

3. The computer-implemented method of claim 1, wherein predicting, by the one or more computing devices, the one or more first locations for the first portion of the vehicle bounding shape comprises:
  predicting, by the one or more computing devices, one or more first shape locations for the vehicle bounding shape; and
  respectively identifying, by the one or more computing devices, a nearest unoccluded vertex of each of the one or more first shape locations.

4. The computer-implemented method of claim 3, wherein predicting, by the one or more computing devices, the one or more first locations for the first portion of the vehicle bounding shape further comprises, for each of the one or more first shape locations:
  identifying, by the one or more computing devices, a dominant side that includes the nearest unoccluded vertex and corresponds to a length of the tracked vehicle.

5. The computer-implemented method of claim 3, wherein respectively identifying, by the one or more computing devices, the nearest unoccluded vertex of each of the one or more first shape locations comprises:
  obtaining, by the one or more computing devices, an occlusion map that describes occluded and unoccluded areas; and
  for each of the one or more first shape locations, iteratively analyzing, by the one or more computing devices, in order of proximity to the autonomous vehicle, one or more nearest vertices of such bounding shape relative to the occlusion map until an unoccluded vertex is identified.

6. The computer-implemented method of claim 3, wherein the method further comprises:
  when the respective nearest unoccluded vertex cannot be identified for one of the first shape locations:
  selecting, by the one or more computing devices, a nearest occluded vertex; and
  increasing, by the one or more computing devices, a covariance value associated with the vehicle bounding shape.

7. The computer-implemented method of claim 1, wherein:
  obtaining, by the one or more computing devices, the observation data descriptive of the one or more sensor observations comprises obtaining, by the one or more computing devices, the observation data descriptive of a plurality of observed points; and
  determining, by the one or more computing devices, the second location of the second portion of the observation bounding shape comprises fitting, by the one or more computing devices, the observation bounding shape around the plurality of observed points such that the fitted observation bounding shape includes all of the plurality of observed points and minimizes a collective distance from the plurality of points to respective closest sides of the observation bounding shape.

8. The computer-implemented method of claim 1, wherein determining, by the one or more computing devices, the second location of the second portion of the observation bounding shape associated with the tracked vehicle comprises:
  identifying, by the one or more computing devices, the second vertex that corresponds to the first vertex of the vehicle bounding polygon; and
  selecting, by the one or more computing devices, the second side for the observation bounding shape that includes the second vertex and is closest in orientation to a predicted heading associated with at least one of the one or more first shape locations.

9. The computer-implemented method of claim 1, wherein:
  the vehicle bounding shape has a first size defined by one or more first values respectively for one or more size parameters;
  the observation bounding shape has a second size defined by one or more second values respectively for the one or more size parameters; and
  the method further comprises:
  comparing, by the one or more computing devices, the second value for each size parameter to the first value for such size parameter; and
  for at least one size parameter for which the second value is greater than the first value, updating, by the one or more computing devices, the first value for such size parameter to equal the second value.

10. The computer-implemented method of claim 9, wherein the vehicle bounding shape comprises a vehicle bounding rectangle, the observation bounding shape comprises an observation bounding rectangle, and the one or more size parameters comprise a width and a length.

11. The computer-implemented method of claim 1, wherein the first portion of the vehicle bounding shape comprises a first vertex or a first side of the vehicle bounding shape.

12. The computer-implemented method of claim 11, wherein the second portion of the observation bounding shape comprises a second vertex or a second side of the observation bounding shape.

13. A computer system, comprising:
  one or more processors; and
  one or more non-transitory computer-readable media that collectively store instructions that, when executed by the one or more processors, cause the computer system to perform operations, the operations comprising:
  predicting, by the one or more computing devices, one or more first shape locations for a vehicle bounding shape associated with a tracked vehicle that is perceived by an autonomous vehicle;
  identifying, by the one or more computing devices, a first dominant portion for each of the one or more first shape locations predicted for the vehicle bounding shape;
  obtaining, by the one or more computing devices, observation data descriptive of one or more sensor observations;
  determining, by the one or more computing devices, a second shape location for an observation bounding shape associated with the tracked vehicle based at least in part on the observation data;
  identifying, by the one or more computing devices, a second dominant portion for the observation bounding shape; and
  determining, by the one or more computing devices, at least one estimated shape location for the vehicle bounding shape based at least in part on a comparison of a first location of the first dominant portion for each of the one or more first shape locations to a second location of the second dominant portion for the observation bounding shape.

14. The computer system of claim 13, wherein determining, by the one or more computing devices, the at least one estimated shape location for the vehicle bounding shape based at least in part on the comparison of the first location of the first dominant portion for each of the one or more first shape locations to the second location of the second dominant portion for the observation bounding shape comprises assigning, by the one or more computing devices, a respective weight to each of the one or more first shape locations based at least in part on the comparison, the respective weight assigned to each first shape location indicative of an amount of agreement between the first location of the first dominant portion identified for such first shape location and the second location of the second dominant portion for the observation bounding shape.

15. The computer system of claim 13, wherein identifying, by the one or more computing devices, the first dominant portion for each of the one or more first shape locations predicted for the vehicle bounding shape comprises identifying, by the one or more computing devices, a nearest unoccluded vertex for each of the one or more first shape locations.

16. The computer system of claim 13, wherein the operations further comprise:
  identifying, by the one or more computing devices, a first dominant side for each of the one or more first shape locations predicted for the vehicle bounding shape; and
  identifying, by the one or more computing devices, a second dominant side for the observation bounding shape;
  wherein determining, by the one or more computing devices, the at least one estimated shape location for the vehicle bounding shape based at least in part on the comparison comprises determining, by the one or more computing devices, the at least one estimated shape location for the vehicle bounding shape based at least in part on the comparison and further based at least in part on a second comparison of a first orientation of the first dominant side for each of the one or more first shape locations to a second orientation of the second dominant side for the observation bounding shape.

17. The computer system of claim 16, wherein identifying, by the one or more computing devices, the second dominant side for the observation bounding shape comprises identifying, by the one or more computing devices, the second dominant side that includes the second dominant portion and has the second orientation that is closest to an expected heading.

18. An autonomous vehicle, comprising:
  a tracking system configured to track vehicles perceived by the autonomous vehicle, wherein the tracking system comprises:
  a motion model configured to predict one or more first shape locations for a vehicle bounding shape associated with a tracked vehicle; and
  an observation model configured to provide a second shape location of an observation bounding shape associated with the tracked vehicle based at least in part on observation data derived from one or more sensors;
  one or more processors; and
  one or more non-transitory computer-readable media that collectively store instructions that, when executed by the one or more processors, cause the one or more processors to perform operations, the operations comprising:
    identifying a first dominant portion for each of the one or more first shape locations predicted for the vehicle bounding shape;
    identifying a second dominant portion for the observation bounding shape;
    performing, for each of the one or more first shape locations, a comparison of the first dominant portion to the second dominant portion; and
    determining at least one estimated current location of the first dominant portion for the vehicle bounding shape based at least in part on the comparison.

19. The autonomous vehicle of claim 18, wherein:
  the motion model comprises a machine-learned motion model; and
  the observation model comprises a machine-learned observation model.

20. The autonomous vehicle of claim 18, wherein at least one of the motion model and the observation model comprises a boosted random forest model.

* * * * *

UNITED STATES PATENT AND TRADEMARK OFFICE
CERTIFICATE OF CORRECTION

PATENT NO. : 10,229,510 B2
APPLICATION NO. : 16/039864
DATED : March 12, 2019
INVENTOR(S) : Brian C. Becker et al.

Page 1 of 1

It is certified that error appears in the above-identified patent and that said Letters Patent is hereby corrected as shown below:

On the Title Page

In the first column, under item (72) "Inventors", third line, please delete "Arunprasad Venkatraman" and insert --Arun Venkatraman--.

Signed and Sealed this
Twenty-second Day of October, 2019

Andrei Iancu
*Director of the United States Patent and Trademark Office*